US008844330B2

(12) United States Patent
Moon et al.

(10) Patent No.: US 8,844,330 B2
(45) Date of Patent: Sep. 30, 2014

(54) CYLINDRICAL LOCKSET

(75) Inventors: Charles W. Moon, Colorado Springs, CO (US); Michael J. Wright, Santa Ana, CA (US)

(73) Assignee: Townsteel Inc., Covina, CA (US)

( * ) Notice: Subject to any disclaimer, the term of this patent is extended or adjusted under 35 U.S.C. 154(b) by 186 days.

(21) Appl. No.: 13/420,532

(22) Filed: Mar. 14, 2012

(65) Prior Publication Data

US 2013/0239632 A1 Sep. 19, 2013

(51) Int. Cl.
*B60R 25/02* (2013.01)

(52) U.S. Cl.
USPC .............. 70/224; 70/223; 70/472; 292/336.3; 292/359; 292/352; 292/353

(58) Field of Classification Search
USPC ............ 70/223, 224, 472; 292/348, 349, 352, 292/353, 359, 336.3
See application file for complete search history.

(56) References Cited

U.S. PATENT DOCUMENTS 2,018,093 A * 10/1935 Schlage .......................... 70/480
2,098,868 A * 11/1937 Grimmond ................... 292/353
2,660,466 A * 11/1953 Cerf, Jr. ........................ 292/352
2,676,050 A * 4/1954 Nichols ......................... 292/348
2,778,667 A * 1/1957 Young ........................... 292/352
3,128,115 A * 4/1964 Patriquin et al. ........... 292/336.3
3,196,644 A * 7/1965 Russell et al. .................. 70/224
3,337,254 A * 8/1967 Russell et al. ................ 292/352
3,621,685 A 11/1971 Sargent
3,779,590 A * 12/1973 Sanders et al. ............. 292/336.3
4,342,478 A * 8/1982 Foshee .......................... 292/352
4,394,821 A 7/1983 Best et al.
4,424,691 A * 1/1984 Foshee ............................ 70/224
4,428,212 A 1/1984 Best et al.
4,428,570 A * 1/1984 Foshee et al. ................. 267/164
4,437,695 A * 3/1984 Foshee .......................... 292/352
5,125,696 A 6/1992 Robida et al.
5,141,269 A 8/1992 Haq et al.
5,269,162 A 12/1993 Robida et al.
5,335,948 A 8/1994 Norton, II et al.
5,421,178 A 6/1995 Hamel et al.
5,476,295 A * 12/1995 Smallegan et al. ........ 292/336.3
5,617,749 A 4/1997 Park
5,694,798 A 12/1997 Nunez et al.
5,761,936 A 6/1998 Katayama
5,794,472 A 8/1998 Kester et al.

(Continued)

OTHER PUBLICATIONS

Builders Hardware Manufacturers Association, American National Standard for Bored and Preassembled Locks and Latches, ANSI/BHMA A152.2-2003.

*Primary Examiner* — Suzanne Barrett
(74) *Attorney, Agent, or Firm* — Eric W. Cernyar

(57) ABSTRACT

A cylindrical lockset comprises a multiple-compartment lock cage subassembly. A retractor is housed within a middle lock cage compartment. Spindle return torsion springs, for biasing corresponding handle-carrying spindles to their default positions, are housed within axially adjacent lock cage compartments. A torque plate transfers torque from the lock cage subassembly to relatively radially distal trim posts. A knob catch assembly seated in each handle-carrying spindle comprises a generally elliptically-shaped wrap around catch spring and a knob catch backup washer to resist axial loads produced by efforts to pull a handle off of the spindle. A key spindle provides a dog travel window defined by a closed, continuous edge of the key spindle, which window is positioned opposite of an axially-extending seam of the key spindle.

18 Claims, 15 Drawing Sheets

(56) References Cited

U.S. PATENT DOCUMENTS

| | | | | |
|---|---|---|---|---|
| 5,845,522 | A | 12/1998 | Shen | |
| 5,931,430 | A | 8/1999 | Palmer | |
| 5,947,537 | A | 9/1999 | Aigner et al. | |
| 5,983,687 | A | 11/1999 | Shen | |
| 6,038,896 | A | 3/2000 | Chamberlain et al. | |
| 6,048,007 | A | 4/2000 | Shor | |
| 6,101,856 | A | 8/2000 | Pelletier et al. | |
| 6,189,351 | B1 | 2/2001 | Eagan et al. | |
| 6,279,360 | B1 | 8/2001 | Shen | |
| 6,412,318 | B1 | 7/2002 | Shen | |
| 6,575,006 | B1 * | 6/2003 | Don | 70/472 |
| 6,626,018 | B2 | 9/2003 | Eller et al. | |
| 6,695,365 | B2 * | 2/2004 | Chong et al. | 292/348 |
| 6,735,993 | B2 | 5/2004 | Eller et al. | |
| 7,143,477 | B2 * | 12/2006 | Dalsing et al. | 16/412 |
| 7,156,432 | B2 * | 1/2007 | Sledge et al. | 292/358 |
| 7,918,114 | B2 * | 4/2011 | Walsh, III | 70/283 |
| 8,087,273 | B2 * | 1/2012 | Liu et al. | 70/224 |
| 2004/0074269 | A1 | 4/2004 | Lee | |
| 2006/0042333 | A1 | 3/2006 | Wu | |
| 2011/0006550 | A1 | 1/2011 | Cho | |

* cited by examiner

Fig. 7
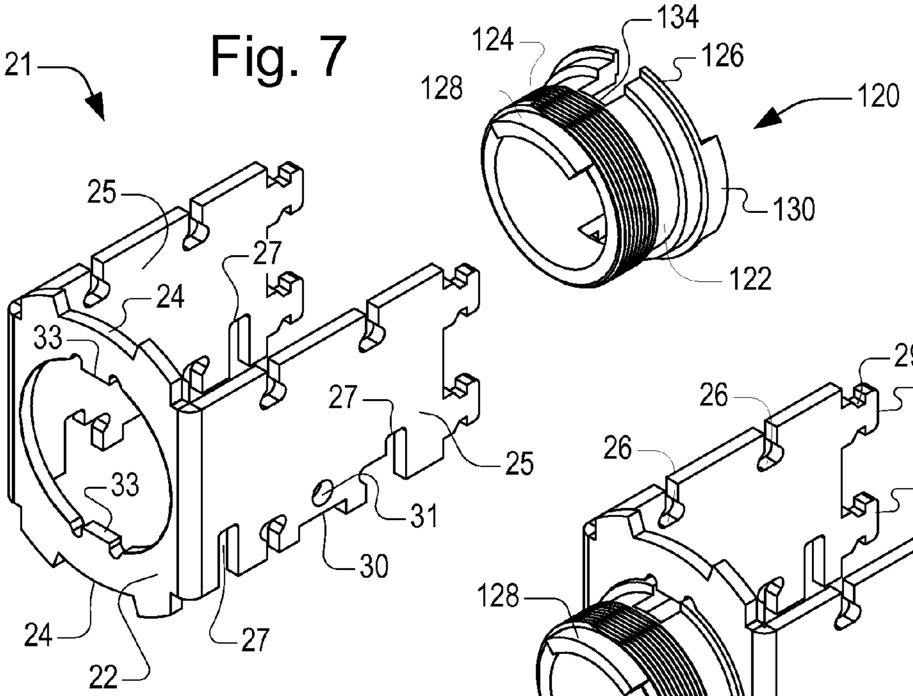
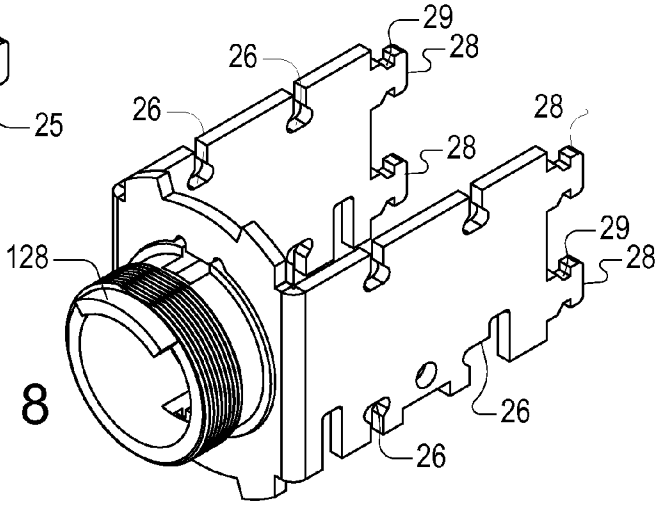
Fig. 8
Fig. 9
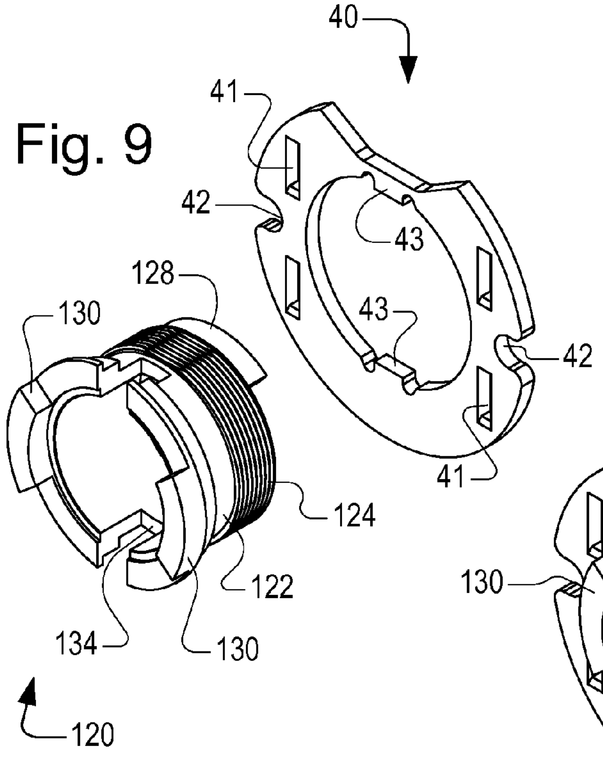
Fig. 10
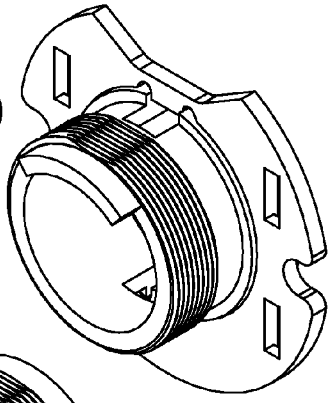
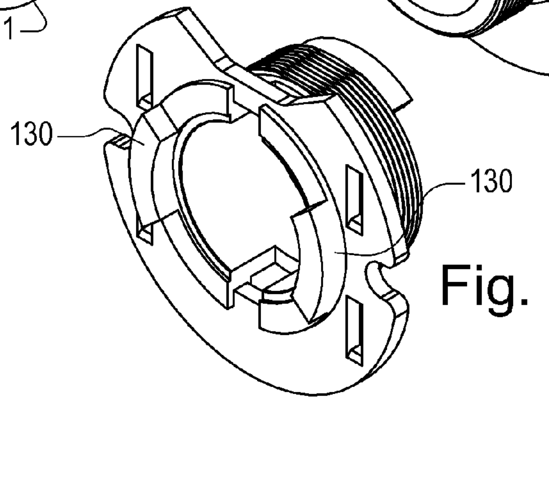
Fig. 11

Fig. 23
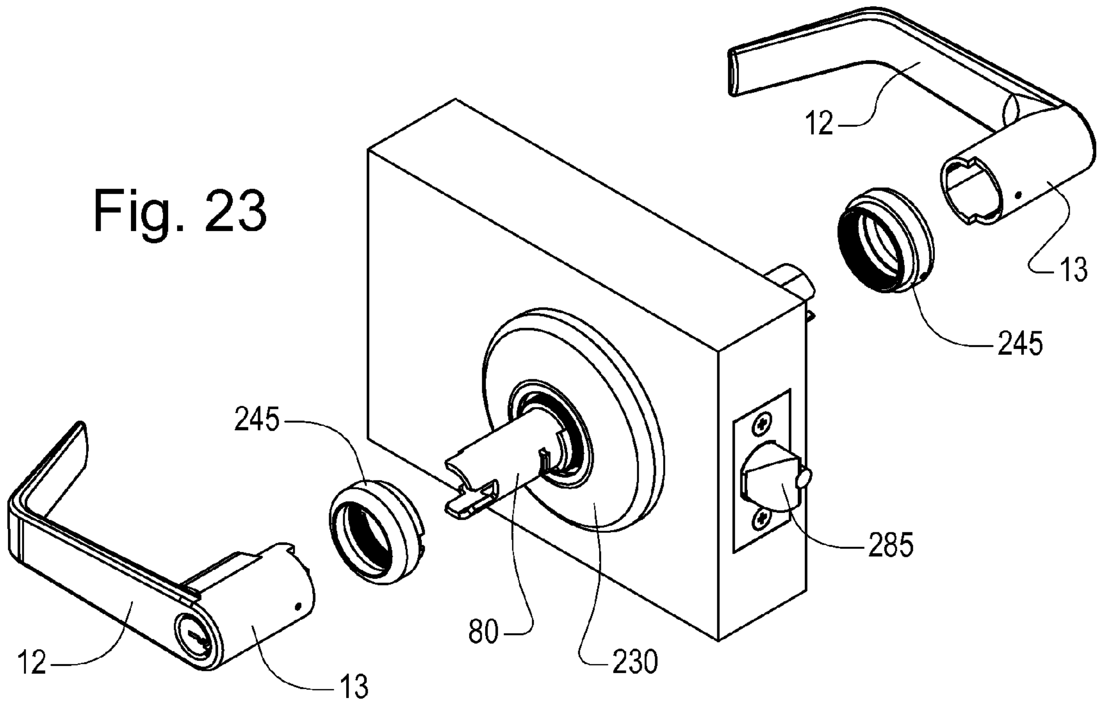
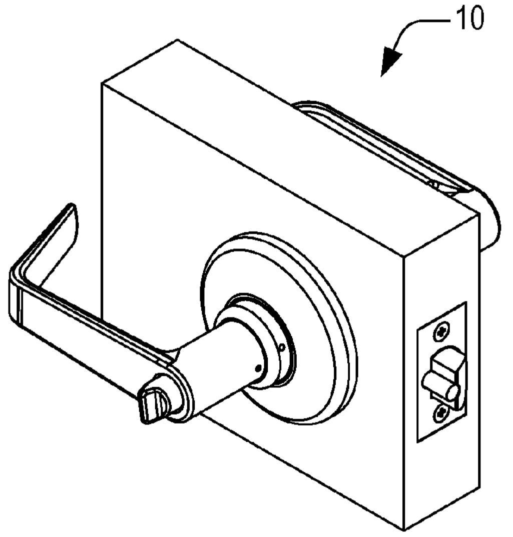
Fig. 24
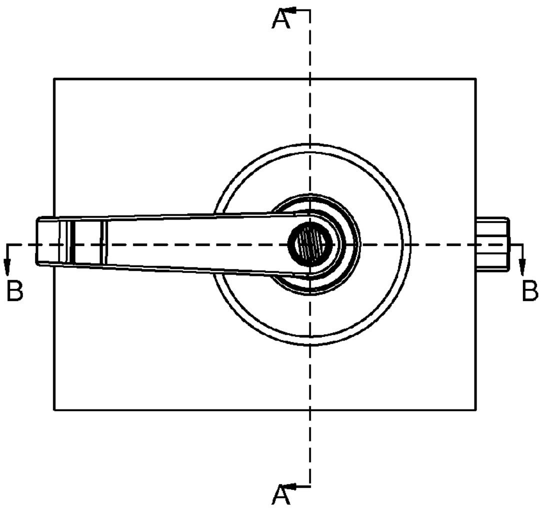
Fig. 25

Fig. 32
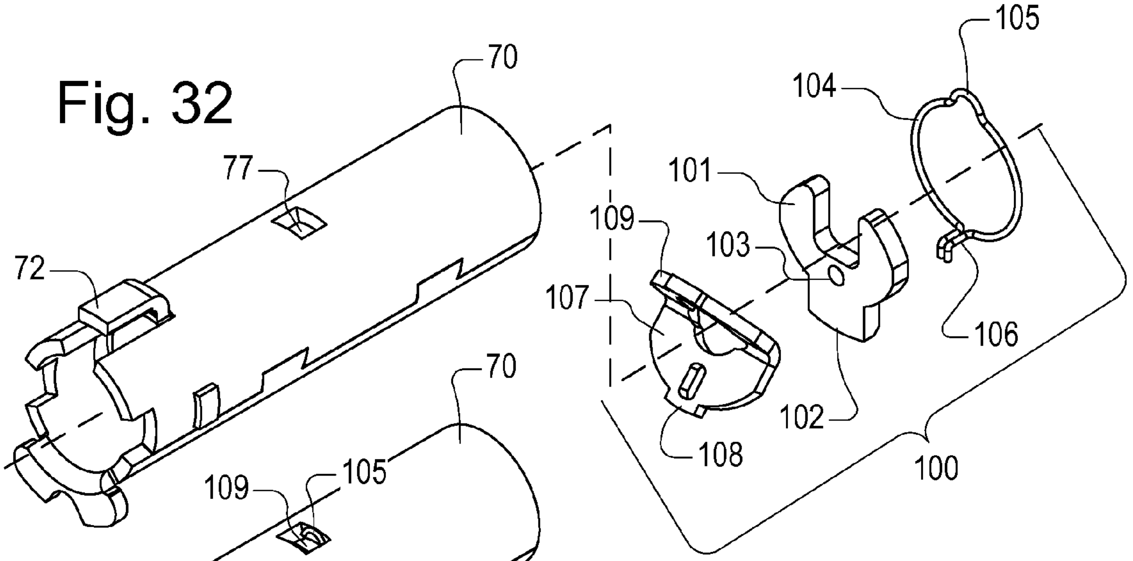
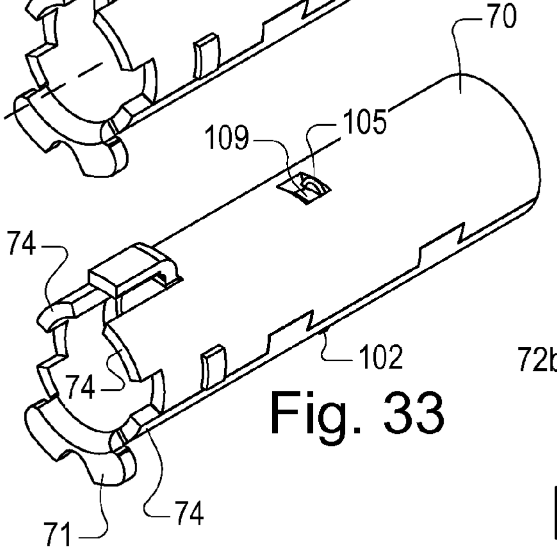
Fig. 33
Fig. 34
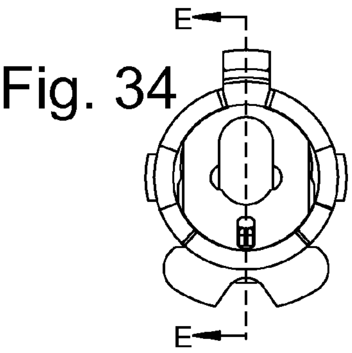
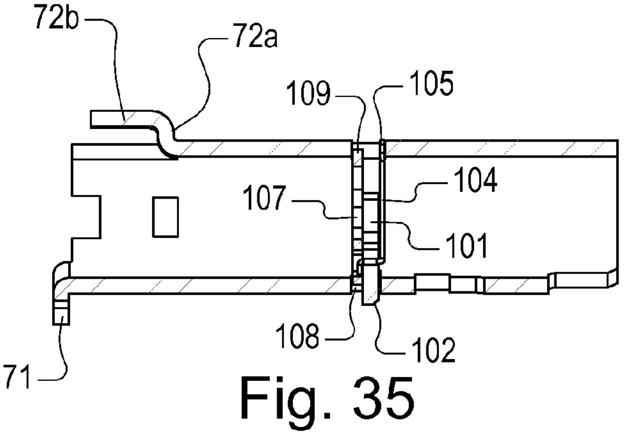
Fig. 35
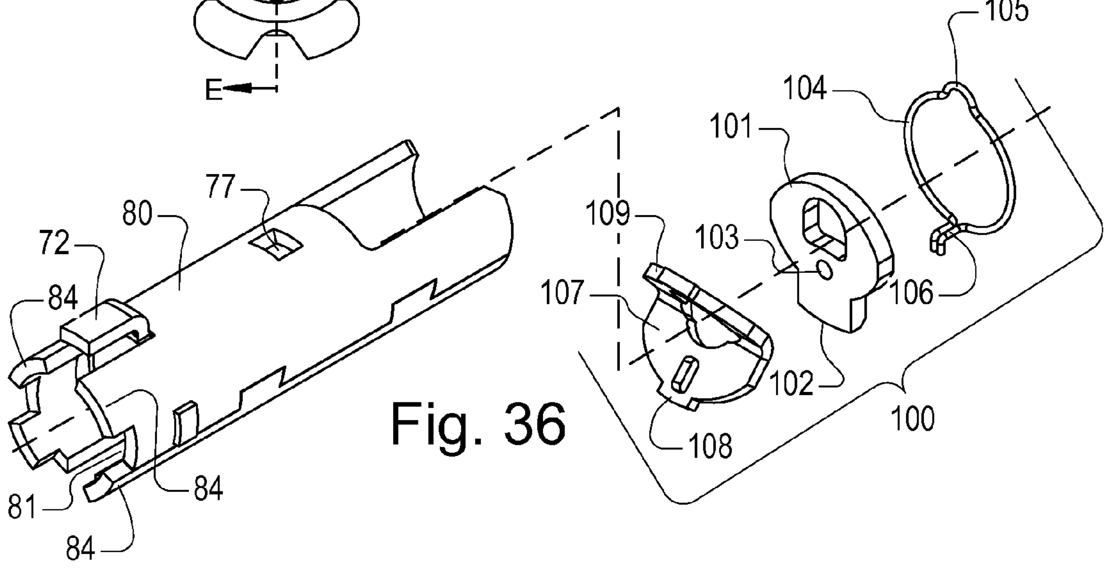
Fig. 36

CYLINDRICAL LOCKSET

RELATED APPLICATIONS

This application is related to simultaneously filed U.S. patent application Ser. No. 13/420,526 by the same inventors and with the same title, which is herein incorporated by reference.

FIELD OF THE INVENTION

This invention relates generally to door latching assemblies, and more specifically, to cylindrical locksets.

BACKGROUND

FIG. 1 is a perspective view of a conventional commercial-grade prior-art cylindrical lockset 4, having internal rose cages 5 that house lever return springs. FIG. 2 is a perspective view of the lockset 4 of FIG. 1 with trim removed, revealing a single compartment lock body 6 that contains only the retractor but not the return springs. Lockset 4 is bulky, and its trim (because it houses internal rose cages 5) is very large and prominent.

FIG. 3 is a perspective view of another conventional commercial-grade prior-art cylindrical lockset 7, in which large cast spindle bearings 8 are provided to house the lever return springs. FIG. 4 is a perspective view of the lockset 7 of FIG. 3 with trim removed, revealing a lock cage and cover 9 that contains only the refractor and large cast spindle bearings 8 housing the lever return springs. Lockset 7 is relatively expensive to fabricate, due to the process of casting the spindle bearings 8. Trim for lockset 4 is also relatively large and prominent.

There is a need for a more innovative cylindrical lockset that is cost-effective and yet provides desired strength, durability, versatility, and functionality characteristics.

FIG. 5 illustrates a conventional cantilever-type knob catch assembly housed in a spindle 69, the knob catch assembly including an elongated cantilevered spring 98 held within an elongated axial slot 68 of the spindle 69. Typically, either the cantilevered spring design yields a handle-retaining force that is weaker than desired, or the spring is so stiff that it too easily and quickly overstressed. Accordingly, there is a need for an improved knob catch assembly for a tubular spindle that provides desired strength and durability characteristics.

The present invention described below, however, can be characterized in many different ways, not all of which are limited by the above-mentioned needs or design constraints.

SUMMARY

In one aspect, a door lock assembly comprises a lock body, a handle-carrying spindle extending through an opening of the lock body, and a knob catch assembly seated in the handle-carrying spindle. In one embodiment, the knob catch assembly comprises a wrap around catch spring seated in an opening of the handle-carrying spindle. The wrap-around catch spring has a substantially continuously curved segment that extends around an arc that is greater than 180 degrees. Release-actuating force imposed on the knob catch assembly elastically deforms the substantially continuously curved segment of the wrap-around catch spring. In another embodiment, the knob catch assembly comprises a knob catch mounted for extended or retracted movement in a knob catch opening, a spring urging the knob catch to an extended position, and a knob catch backup washer to resist axial loads produced by efforts to pull a handle off of the spindle.

In another aspect, a door lock assembly comprises a spindle, for carrying a handle, extending through an opening of a lock body and a key spindle assembly, for driving a retractor housed within the lock body, mounted in the spindle. The key spindle assembly has one or more retractor activation cams operable, upon rotation of the key spindle assembly, to cam the retractor into a latch-retracting position. The key spindle assembly also comprises a key spindle housing a key spindle dog for rotation within the key spindle. The key spindle dog has a dog arm protruding through a dog travel opening of the key spindle. The dog arm protrudes into a key spindle dog driving slot of the spindle, rotationally interlocking the handle-carrying spindle to the dog arm. In one embodiment, the dog travel opening is a window defined by a closed, continuous edge of the key spindle. In another embodiment, the dog travel opening is positioned opposite of an axially-extending seam of the key spindle formed from a sheet metal piece rolled up into a generally tubular form.

In yet another aspect, selection between a standard lock trim configuration and a rigid lock trim configuration is operable to be effected merely by selecting an appropriate key spindle assembly, without structural modification of other parts of the cylindrical lock assembly.

These and other aspects and advantages of the embodiments disclosed herein will become apparent in connection with the drawings and detailed disclosure that follows.

BRIEF DESCRIPTION OF THE DRAWINGS

FIG. 7 is a perspective exploded view of the pre joined multi-compartmented lock cage subassembly main piece and spindle bearing.

FIG. 8 is a perspective view of the spindle bearing following its assembly to the main piece.

FIG. 9 is a perspective view of a pre-joined end plate and spindle bearing.

FIG. 10 illustrates one perspective view of the pre-joined end plate and spindle bearing following their interconnection.

FIG. 11 illustrates an opposite perspective view of the pre-joined end plate and spindle bearing.

FIG. 23 is another partially exploded view of the cylindrical lock assembly or lockset partially installed in a door.

FIG. 24 is a perspective view of the assembled cylindrical lock assembly or lockset, including trim, and installed in a door.

FIG. 25 is a front plan view of the assembled cylindrical lock assembly or lockset of FIG. 24.

FIG. 32 is an exploded view of an embodiment of a knob catch assembly configured for the inside handle-carrying spindle.

FIG. 33 is a perspective view of the inside handle-carrying spindle with the knob catch assembly assembled within.

FIG. 34 is an end plan view of the spindle and knob catch assembly of FIG. 33.

FIG. 35 is a partial cross-sectional view of an embodiment of the spindle and knob catch assembly taken along line E-E of FIG. 34.

FIG. 36 is an exploded view of an embodiment of the outside handle knob catch assembly handle-carrying.

DETAILED DESCRIPTION

Figure 1:
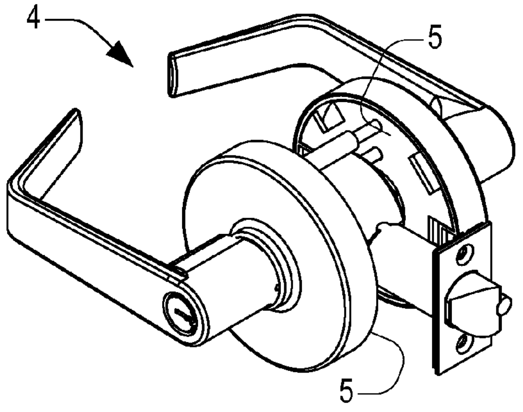
Fig. 1 PRIOR ART
FIG. 1 is a perspective view of a conventional prior-art cylindrical lockset, including internal rose cages that house the lever return springs.

FIGS. 6-44 illustrate various embodiments and aspects of a multi-lock-function-supporting cylindrical lock assembly (or lockset) 10. The cylindrical lock assembly 10 is preferably made of steel and, despite its light weight and extensive use of sheet metal parts, complies with ANSI/BHMA A156.2-2003 requirements (the specification of which is incorporated by reference) for a Grade 1 lock. The cylindrical lock assembly 10 comprises a lock chassis assembly 18, torque plate 110, key spindle assembly 140, inside handle button stem subassembly 200, key cylinder 215, cylindrical handle-carrying spindles 70 and 80, a latch bolt assembly 280, and trim pieces 220, 230, 240, and 245. The cylindrical lock assembly 10 depicted herein accommodates a range of standard door widths, such as between 1¾" and 2" width doors.

Figure 6:
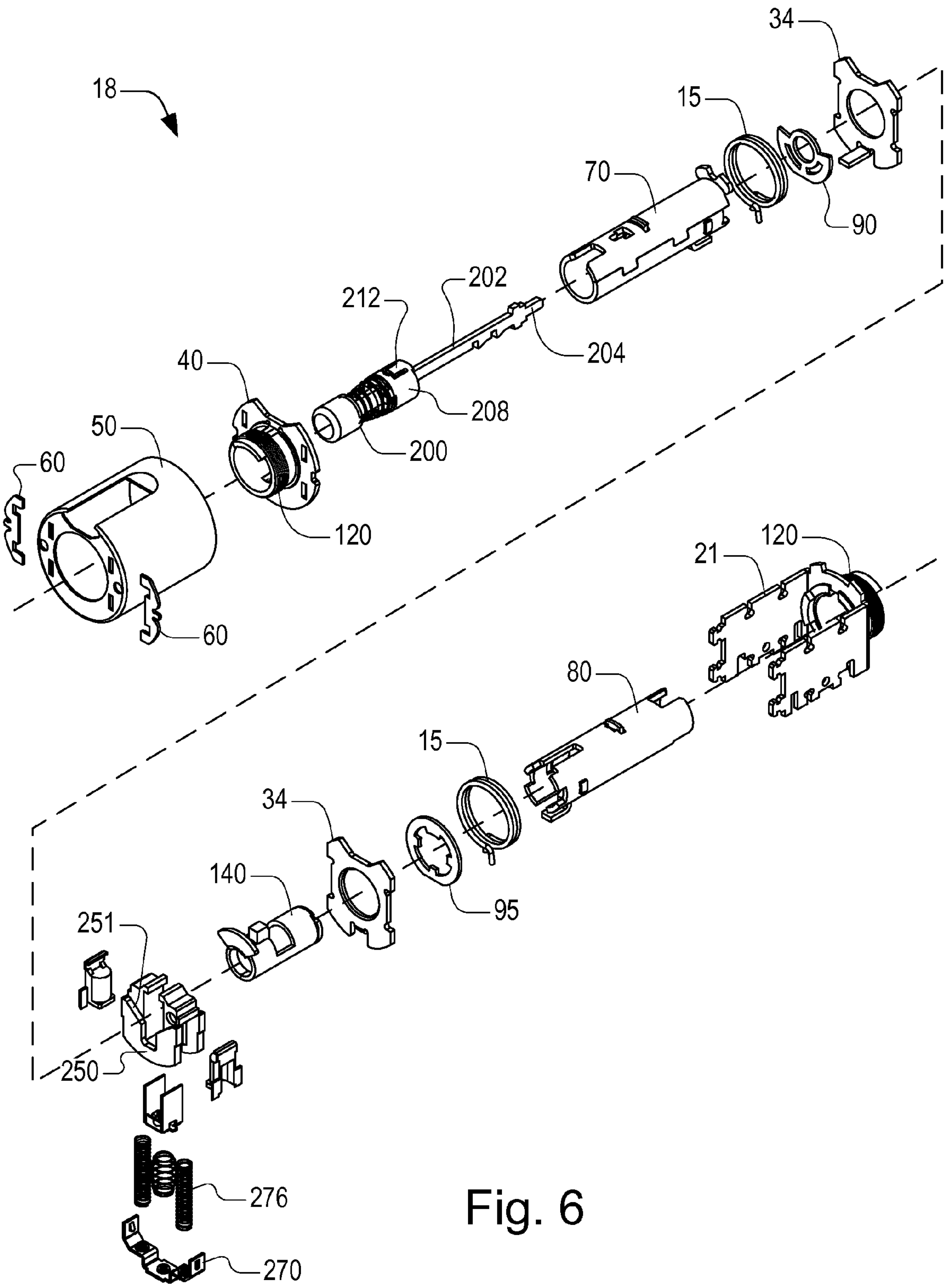
FIG. 6 is an exploded perspective view of one embodiment of a lock chassis assembly.
Figure 12:
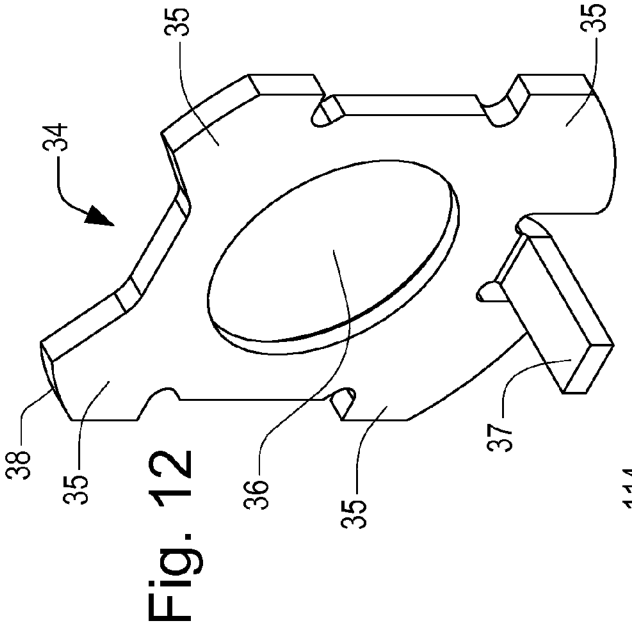
FIG. 12 is a perspective view of a separator plate.
Figure 18:
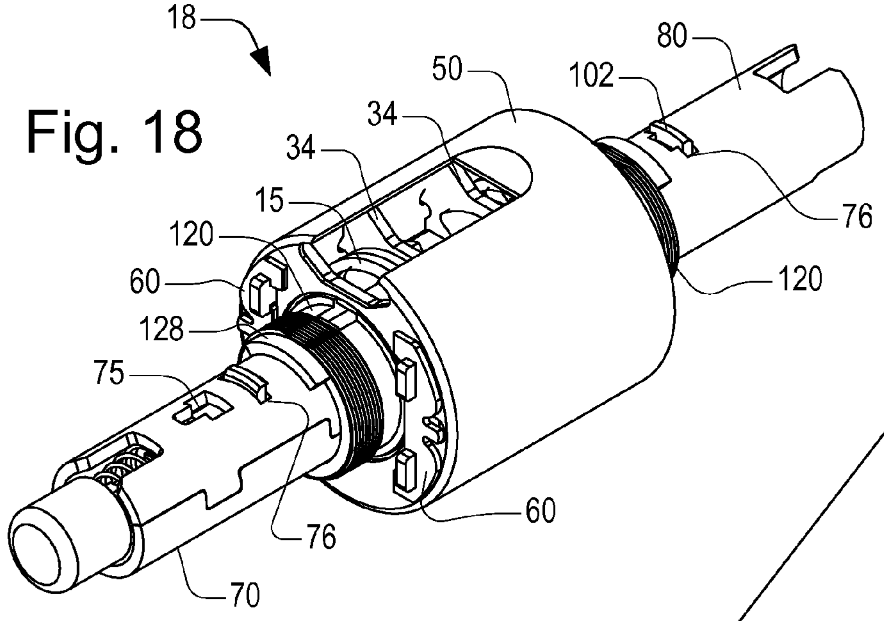
FIG. 18 is a perspective view of the lock chassis assembly.
Figure 19:
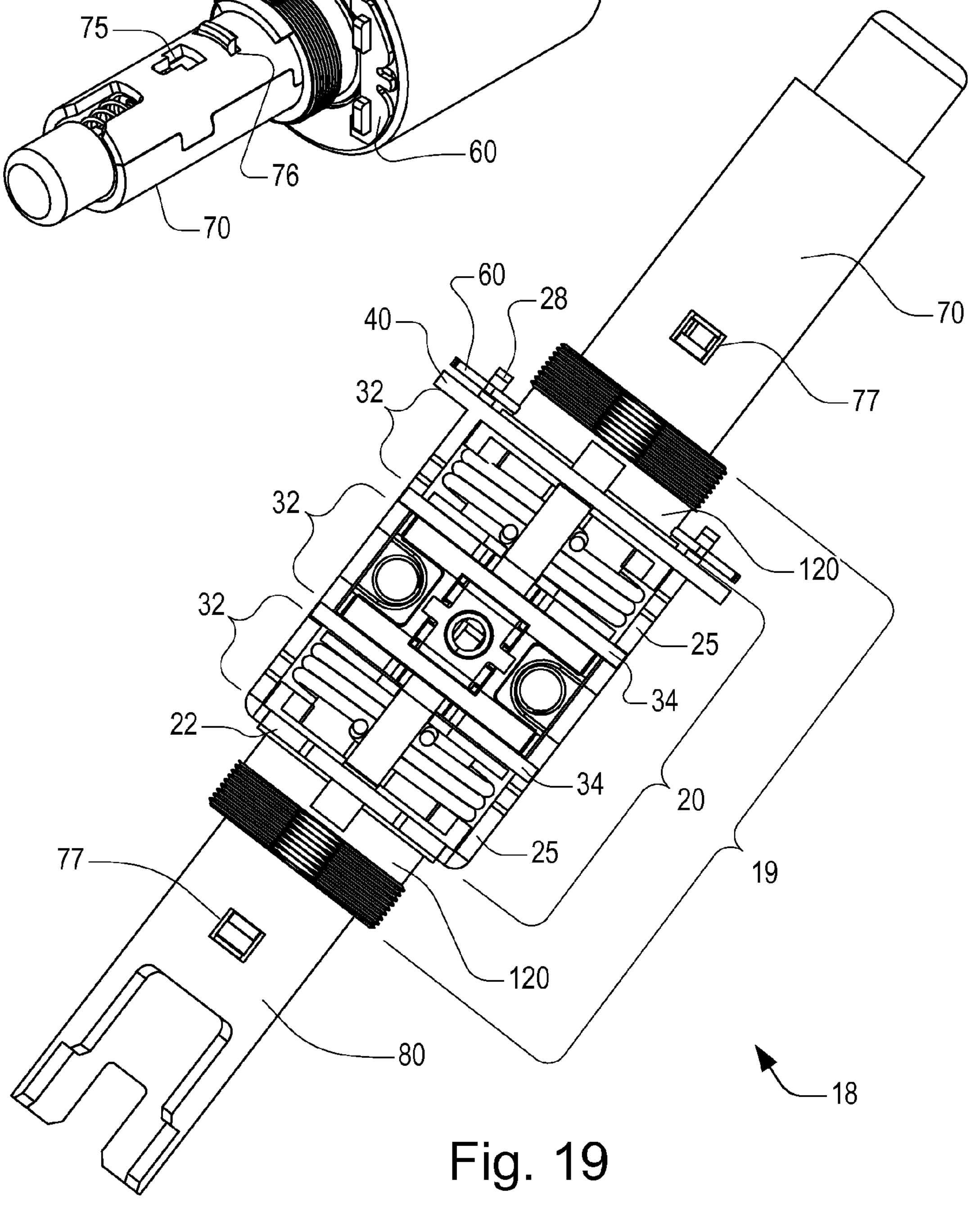
FIG. 19 is a top, cut-away view of the lock chassis assembly.

Attention is first directed to the lock chassis assembly 18. FIG. 6 is a perspective exploded view of one embodiment of a lock chassis assembly 18, and FIG. 18 provides a perspective view of the lock chassis assembly 18 in assembled form. As best illustrated in FIGS. 18 and 19, the lock chassis assembly 18 comprises the lock body 19, cover 50, and tubular handle-carrying spindles 70 and 80. The lock body 19 comprises the multi-compartment lock cage subassembly 20 and spindle bearings 120.

FIGS. 7-12 illustrate the components of the multi-compartment lock cage subassembly 20 (alternatively referred to as a chassis), which houses both the retractor 250 and two torsion-type spindle return springs 15 (alternatively referred to as lever return springs) within axially adjacent compartments 32 (FIG. 19). The lock cage subassembly 20 comprises a main piece 21, an end plate 40, and separator plates 34, all formed out of stamped sheet metal (preferably steel).

As shown in FIGS. 7-11, spindle bearings 120—preferably machined and not cast—are securely mounted to each of the main piece 21 and end plate 40 (through corresponding spindle bearing apertures) prior to assembly of the lock cage subassembly 20. Notches 134 line the spindle bearing 120 up with and index into corresponding tabs 33 or 43 of the lock cage main piece base portion 22 or end plate 40, respectively. A ring-shaped cage retaining flange 126 butts the spindle bearing 120 against the corresponding lock cage main piece base portion 22 or end plate 40. Each spindle bearing 120 is also securely ring staked, opposite the lock cage retaining flange 126, to the corresponding lock cage main piece base portion 22 or end plate 40.

Figure 20:
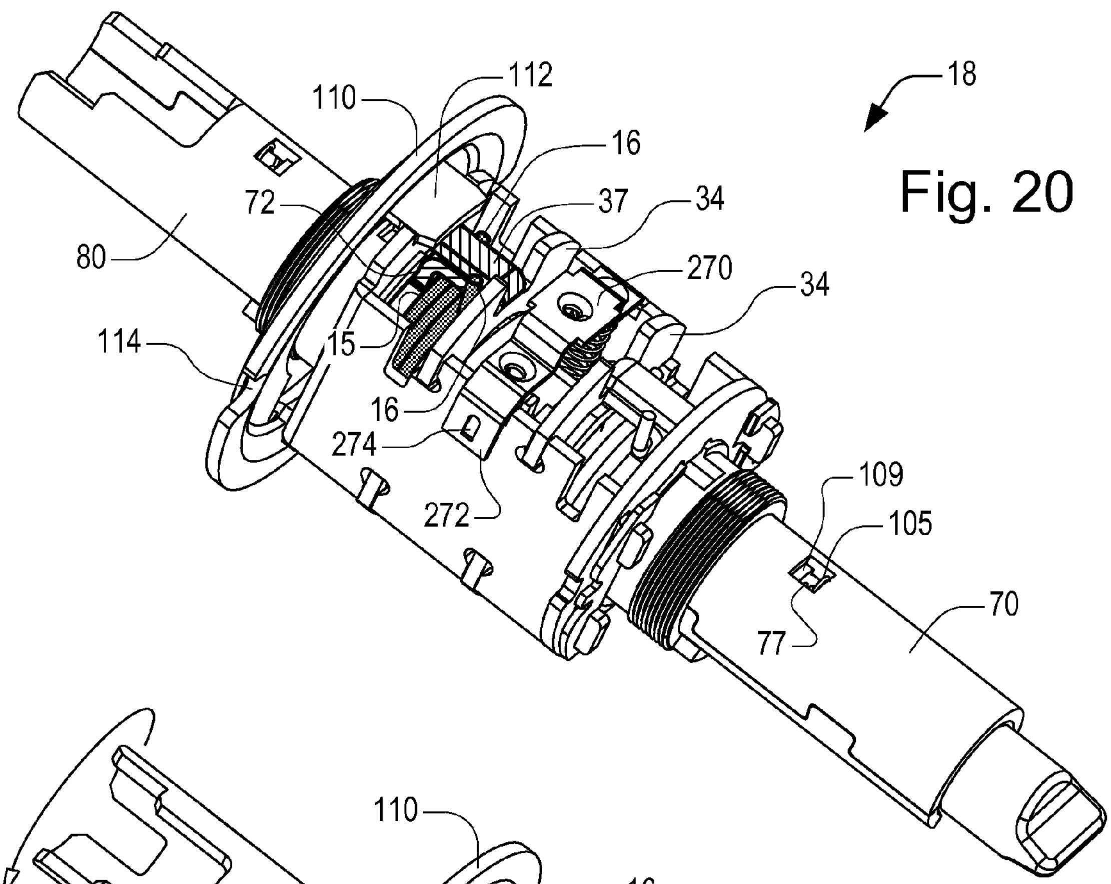
FIG. 20 is a perspective cut-away view of the lock chassis assembly with a torque plate, illustrating a torsion lever return spring biasing the outer handle-carrying spindle to the neutral, non-latch-retracting position.
Figure 21:
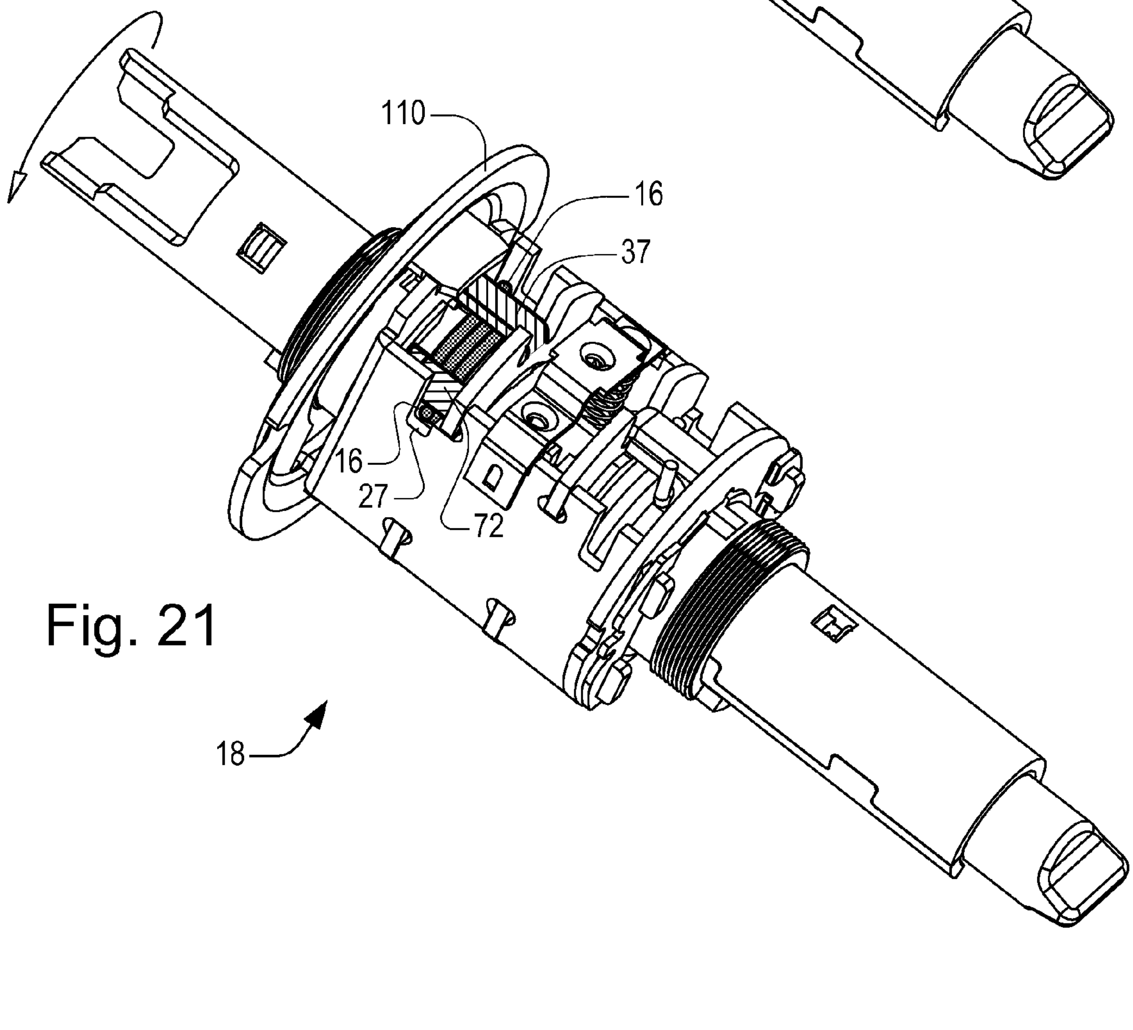
FIG. 21 is a perspective cut-away view of the same lock chassis assembly of FIG. 20, illustrating the outer handle-carrying spindle rotated to a maximum clockwise position, winding up the torsion lever return spring.

The main piece 21 comprises a base portion 22 and two axially-extending edge flanges 25. Separator plate notches 26 formed in the edge flanges 25 retain the separator plates 34 (FIG. 12), as illustrated in FIGS. 20 and 21. Torsion spring leg notches 27 formed in the edge flanges 25 provide room for legs 16 of spindle return springs 15 to travel through full configured limits of spindle rotation, as illustrated in FIG. 21.

The separator plates 34 (FIG. 12) divide the lock cage subassembly 20 into three compartments 32 (FIG. 19), a middle compartment for the retractor 250 and two axially adjacent compartments for the spindle return springs 15. Engagement flanges 35 (alternatively referred to as corner toes) seat the separator plates 34 in corresponding lock cage notches 25. Centrally located spindle apertures 36 allow handle-carrying spindles 70 and/or 80 to pass through. Radiused edges 38 enable the separator plates 34 to fit securely within in the cylindrical sheet metal cover 50.

Each spindle 70 and 80 is mounted for rotation in the cylindrical sleeve 122 of the corresponding spindle bearing 120. As illustrated in FIGS. 32 and 34, each spindle 70 and 80 is formed of rolled-up stamped sheet metal (preferably steel).

The inner spindle 70 includes bent up, ear-like retractor activation cams 71 (referred to by some in the art as roll-back cams) that are configured to engage and operate on corresponding retractor slide cam surfaces 251 (FIG. 6) when a user turns the inside door handle 12.

As discussed in more detail below, each spindle 70 and 80 provides a knob catch lug cross slot 76 (FIGS. 18, 37 and 38) and a knob catch spring seat 77 (FIGS. 32 and 36) positioned opposite the knob catch cross slot 76. The knob catch lug cross slot 76 provides an aperture for the depressible knob catch projecting lug 102. The knob catch spring seat 77 provides an aperture or depression for seating the knob catch spring 104.

The inside spindle 70 also provides an inside lever button subassembly collar retention slot 75 (FIG. 18) for retaining the resilient tab 212 of a collar 208 of the inside handle button subassembly 200. The outside spindle 80 provides an axially extending key spindle dog driving slot 81 (FIG. 36) that interfaces with the key spindle dog arm 162 of a key spindle assembly 140 and allows for axial movement of the dog arm 162 within the slot 81.

It will be understood that some cylindrical lock configurations may use two inner spindles 70 (e.g., for a non-locking passage) or two outer spindles 80 (where both are locking).

The lock body end of the inner spindle 70 extends all the way through the spindle aperture 36 of one of the separator plates 34, with its retractor activation cams 71 in the middle compartment 32 ready to act on the retractor 250. The lock body end of the outer spindle 80, which houses a key cylinder assembly 140, extends just into the spindle aperture 36 of the opposite separator plate 34.

Figure 13:
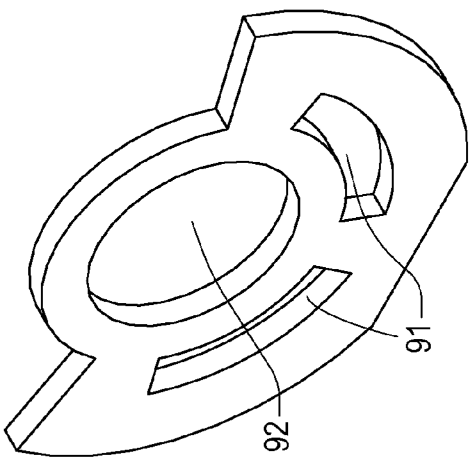
FIG. 13 is a perspective view of the inner spindle handle-carrying thrust plate.
Figure 14:
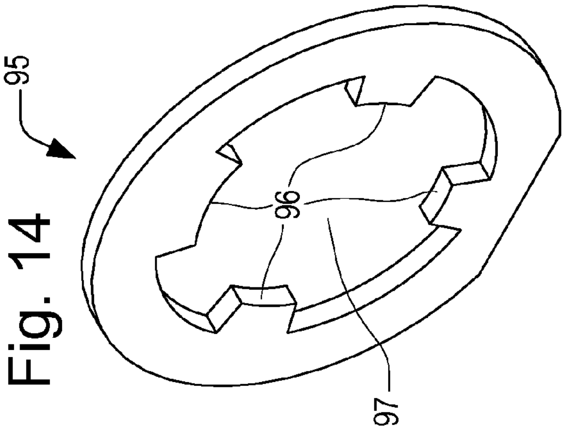
FIG. 14 is a perspective view of the outer spindle handle-carrying thrust plate.
Figure 15:
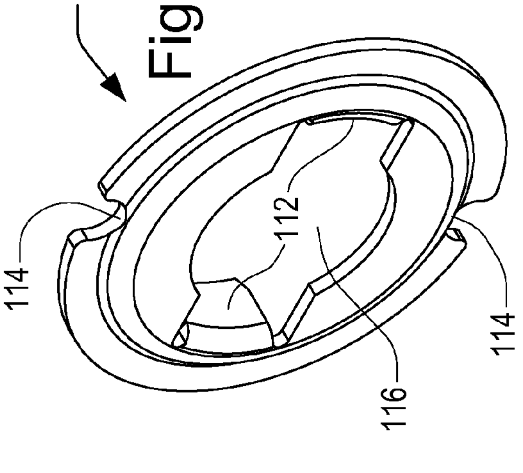
FIG. 15 is a perspective view of the torque plate.

As illustrated in FIGS. 13 and 14, thrust washers (or thrust plates) 90 and 95 provide a wide area bearing surface to distribute axial and rotational loads of the corresponding spindle 70 or 80 against its corresponding separator plate 34. The arcuate slots 91 seat the thrust washer 90 over corresponding crenellations 74 (FIG. 33) of the inner spindle 70. Arcuate centrally projecting tabs 96 of the thrust washer 95 enable it to seat between corresponding crenellations 84 (FIG. 36) of the outer spindle 80. Each thrust washer 90 and 95 includes a respective spindle aperture 92 or 97 to permit passagethrough of a respective push button stem 202 (FIGS. 6, 29) or key spindle assembly 140.

Figure 29:
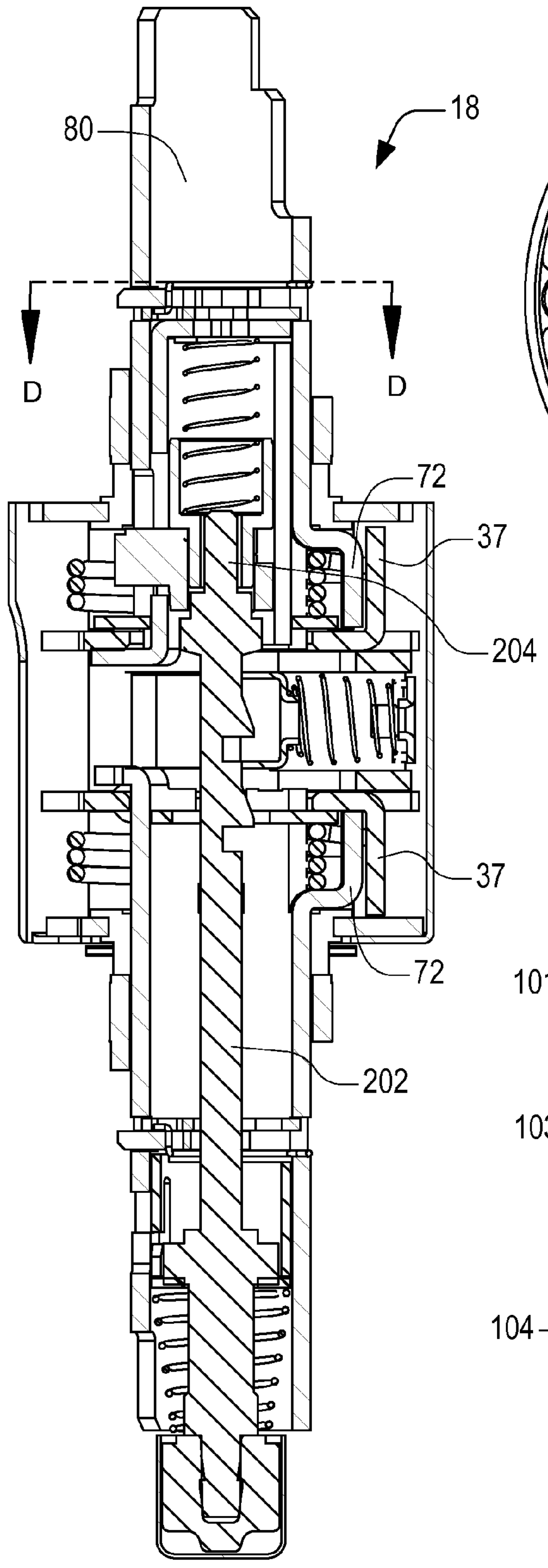
FIG. 29 is another partial cross-sectional view taken along line B-B of FIG. 25, not including any trim.
Figure 30:
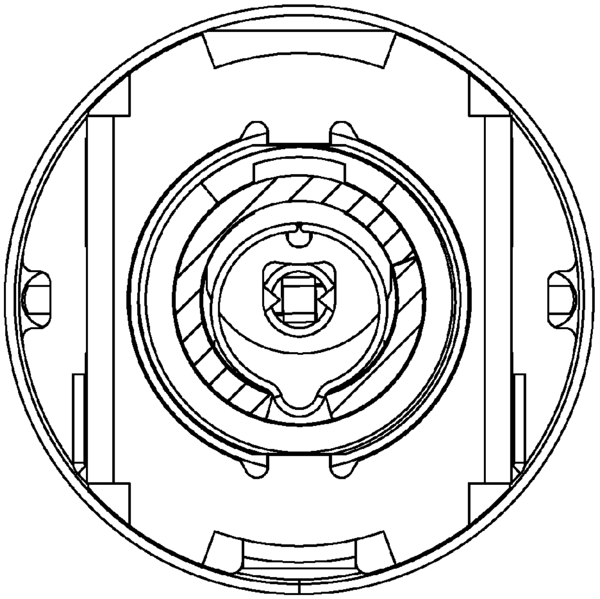
FIG. 30 is a partial cross-sectional view taken along line D-D of FIG. 29, illustrating one embodiment of an outside handle knob catch assembly.
Figure 31:
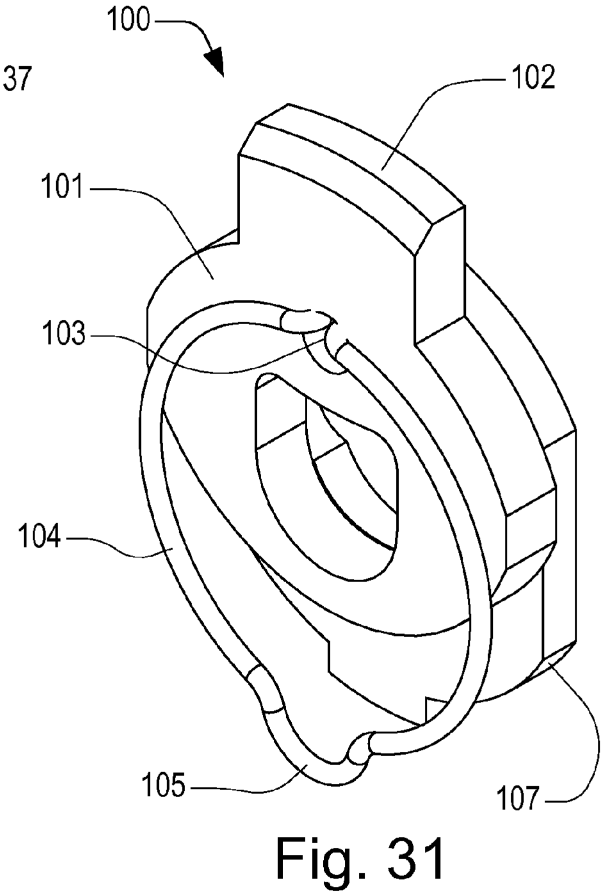
FIG. 31 is a perspective view of one embodiment of the outside handle knob catch assembly.

Each spindle 70 and 80 includes a curved distal tab 72 (alternatively referred to as bent-up spring tab) that includes radial and axial extending portions 72*a* and 72*b* (FIG. 35), respectively. The curved distal tab 72 is sized for rotational movement within the corresponding spindle return spring compartment 32, and serves to wind up a corresponding spindle return spring 15. Serving a complementary function, each separator plate 34 includes a bent spring retaining tab (or torsion spring leg stop) 37. As shown in FIG. 29, tab 72 is, in a neutral position, positioned just under the torsion leg stop 37 of the separator plate 34. As shown in FIG. 20, the spring legs 16 of the corresponding spindle return spring 15 are mounted, in tension, on either side of tabs 72 and 37. As comparatively illustrated in FIGS. 20 and 21, the axially extending portion 72*b* of the tab 72 bears against one or the other of the spring legs 16—depending on the direction of rotation—of the spindle return spring 15 while the spring retaining tab 37 of the separator plate 34 holds the opposite spring leg 16 in place, winding up the spindle return spring 15 as the spindle 70 or 80 turns.

Focusing again on the lock cage subassembly 20, retractor biasing spring retainer notches 30 and holes 31 formed in the edge flanges 25 (FIG. 7) receive mounting tabs 272 and catch projections 274, respectively, a spring retainer 270 (FIGS. 6, 20). The spring retainer 270 seats latch springs 276 (FIG. 28) to urge the retractor 250 into a latch-extending position.

The edge flanges 25 are originally bent (in the die) at right angles with the base portion 22. During assembly, the edge flanges 25 are opened slightly to receive and enable assembly of the internal components of the lock body 19, including the separator plates 34, torsion spindle return springs 15, thrust plates 90 and 95, the key cylinder assembly 140, and the retractor 250. Also during assembly, the edge flanges 25 are bent back to right angles with the base portion 22, and the end plate 40 mounted to the edge flanges 25 through lugs 28.

The configuration of the lugs 28 (FIG. 8) and the corresponding slots 41 (FIG. 9) of the end plate 40 allow the end plate 40 to be directly axially inserted on and mounted to the main piece 21, without axial offset. After mounting the end plate 40 to the main piece 21, the cover 50 is placed over, in sleeve-like fashion, over the lock body 19, causing lugs 28, which already project through the aligned end plate slots 41 (FIG. 9), to further project through cover slots 53 (FIG. 17).

Figure 2:
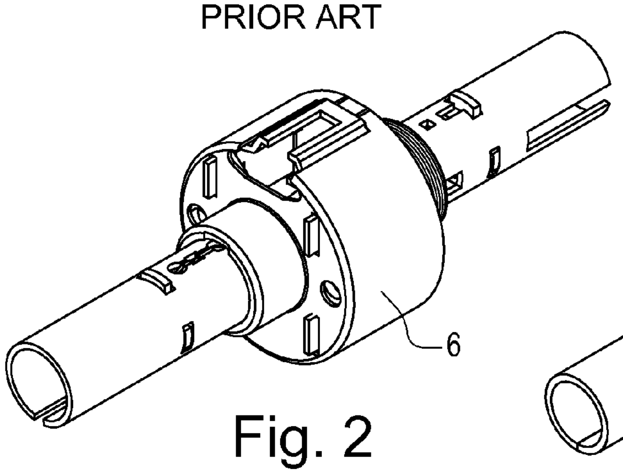
Fig. 2 PRIOR ART
FIG. 2 is a perspective view of the lockset of FIG. 1 with trim removed, revealing a lock body that contains only the retractor but not the return springs.
Figure 17:
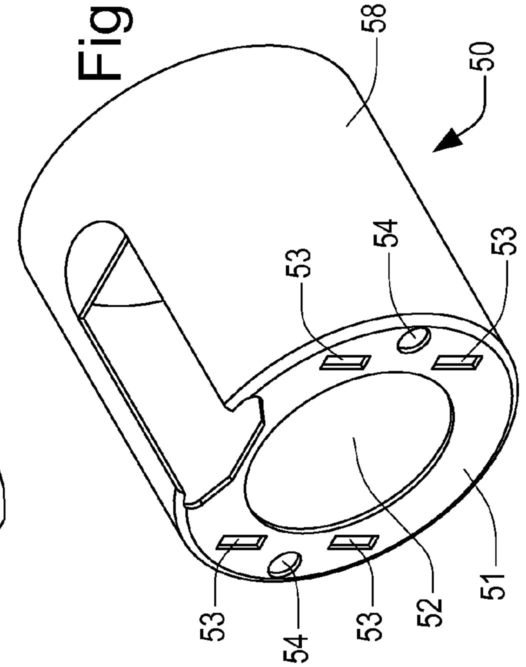
FIG. 17 is a perspective view of the cover.

The drawn sheet metal cover 50 (alternatively referred to as a cover cylinder), best illustrated in FIG. 17, comprises a ring-shaped base portion 51 and a cylindrical sleeve portion 58. The sleeve portion 58 has an outer radius sized for insertion and fit into a cylindrical aperture of a door. Unlike conventional sheet metal covers (such as the cover 6 illustrated in prior art FIG. 2), cover 50 encloses the spindle return springs 15, and is longer than most conventional sheet metal covers. The base portion 51 provides a spindle bearing aperture 52 and cage retaining slots 53. The cage retaining slots 53 are aligned with slots 41 of the end plate 40 (FIG. 9).

Figure 16:
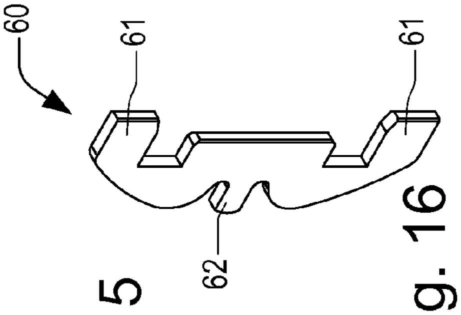
FIG. 16 is a perspective view of one of the keepers.

Sheet metal keepers 60, best illustrated in FIG. 16, secure the end plate 40 and cover 50 onto the lock cage lugs 28. The mounting legs 61 mount behind lug notches 29 of the lock cage main piece 21. Tabs 62 are bent into the tab holes 54 of the cover 50 and engage in cover retainer notches 42 of the end plate 40. As will be appreciated, the keepers 60 retain the end plate 40, as well as the cover 50, on the main piece 21, after the end plate 40 is directly axially inserted on to the main piece 21.

Several unique structures (which can be used individually or in combination) are provided to protect internal components of the lock body 19 from excessive torque and to transfer torque from the lock body 19, and in particular the multi-compartment lock cage subassembly 20, to the trim posts 232, to the door. One of these structures is a torque plate 110. Another structure is a lever-side rotational stop 128 on the spindle bearing 120. Yet another structure is a pair of cage-side rotational stops 130 on the spindle bearing 120.

Referring first to the torque plate mechanism, torque plate index slots 24 are formed in the base portion 22 to receive tabs or flanges 112 of a torque plate 110. The torque plate 110 (FIG. 15) is (like the lock cage subassembly 20 itself) formed of sheet metal.

Figure 22:
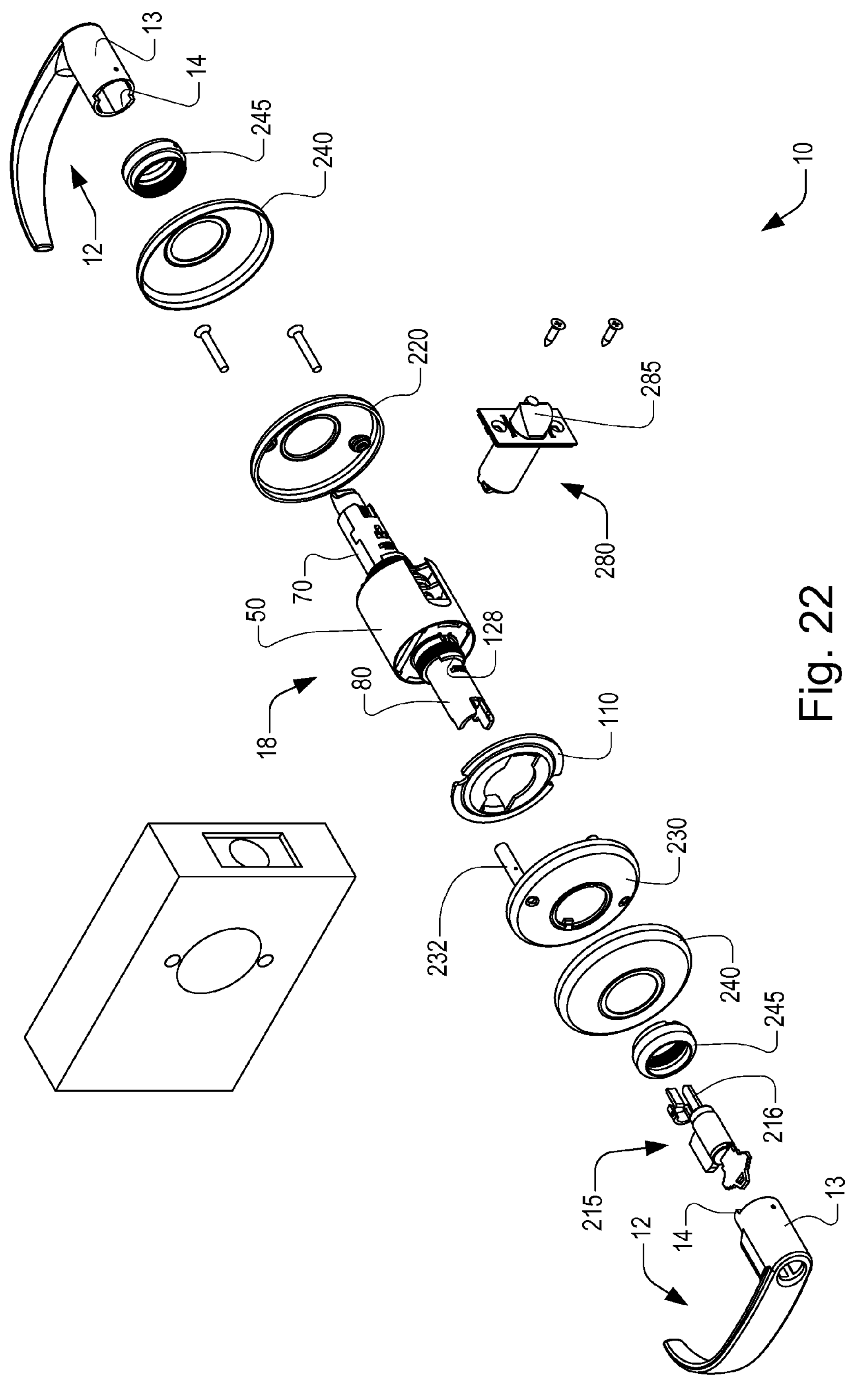
FIG. 22 is an exploded view of one embodiment of a cylindrical lock assembly or lockset, including a torque plate and trim pieces.
Figure 26:
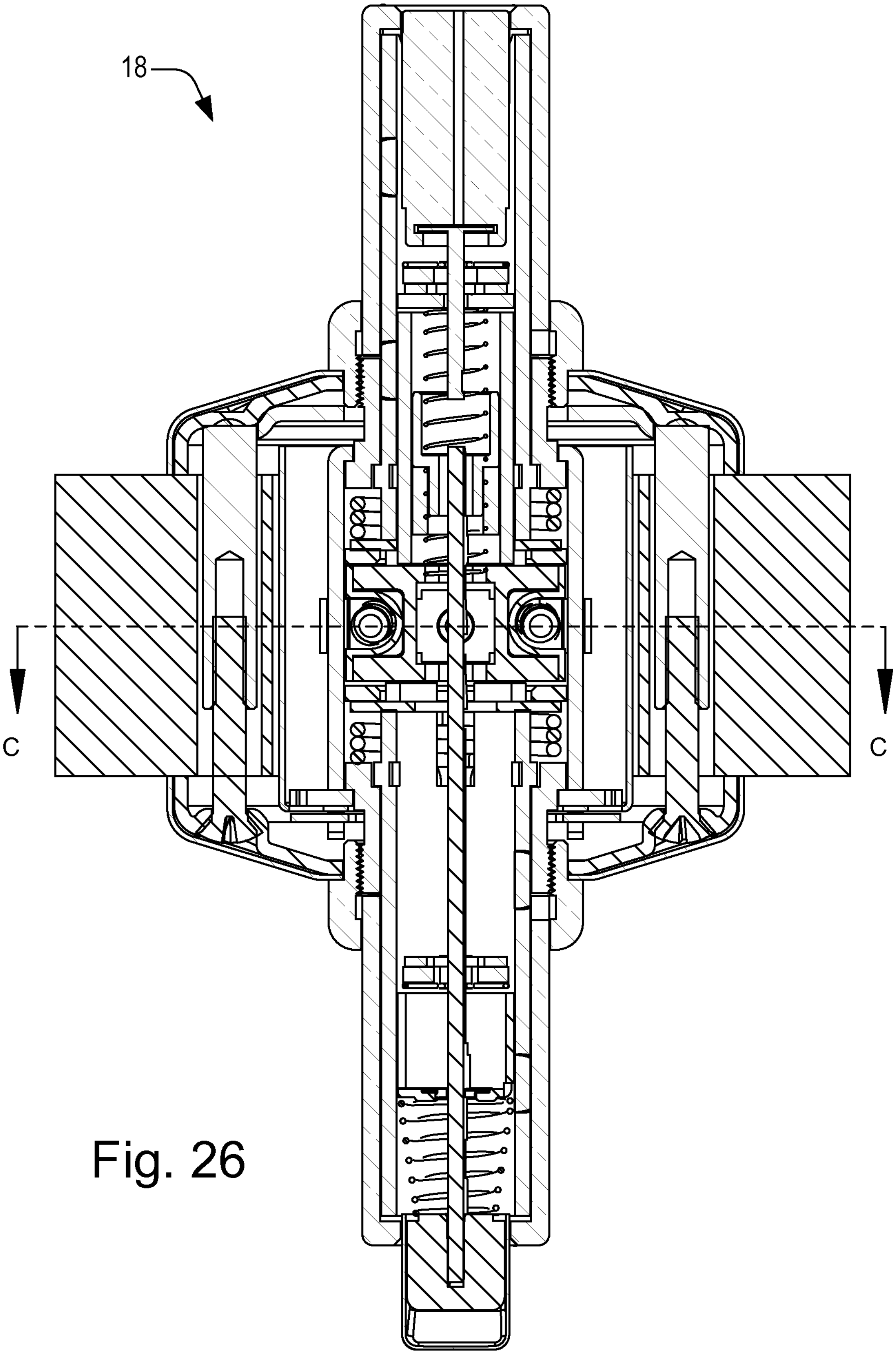
FIG. 26 is a partial cross-sectional view taken along line A-A of FIG. 25.
Figure 27:
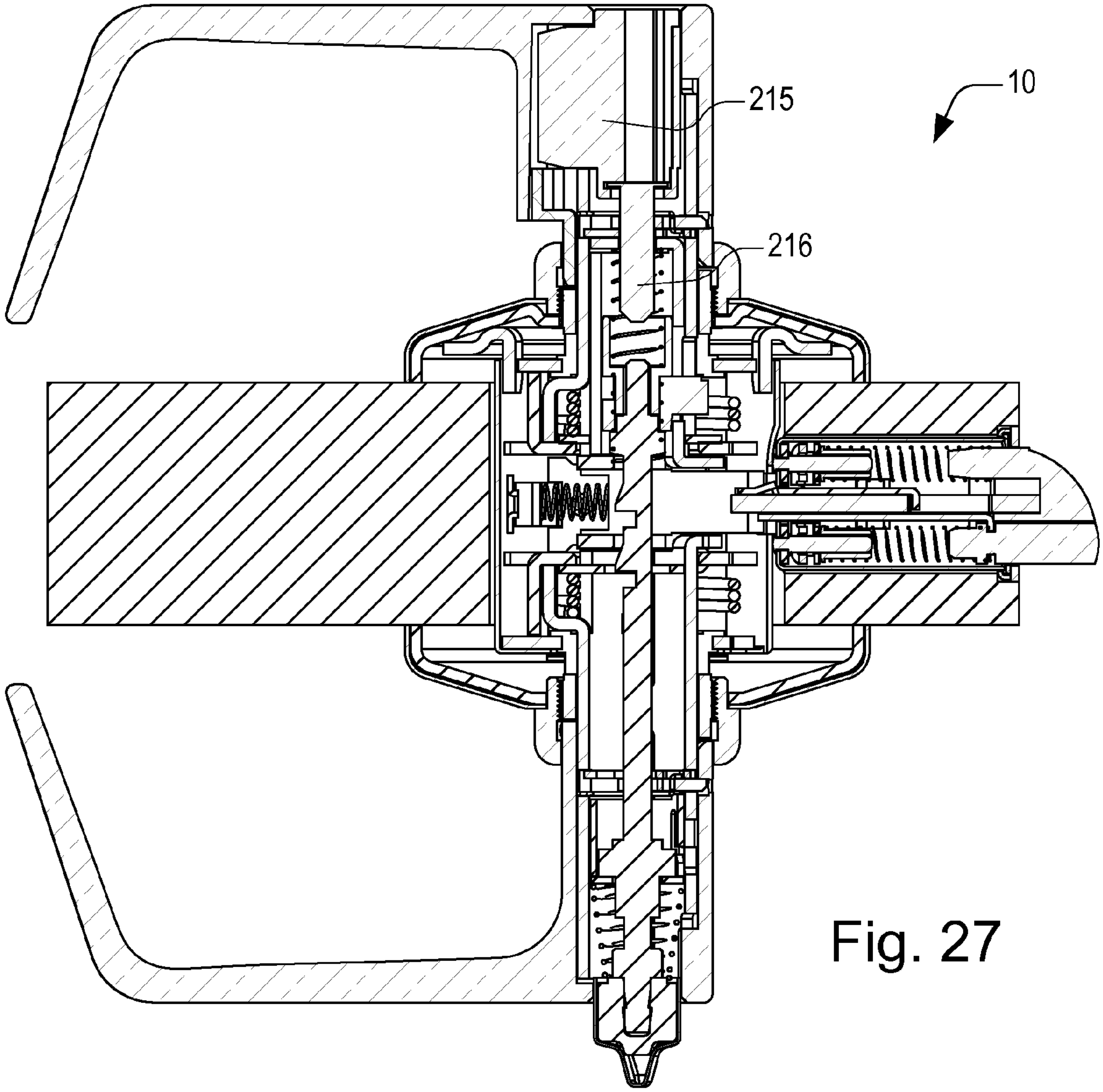
FIG. 27 is a partial cross-sectional view taken along line B-B of FIG. 25.
Figure 28:
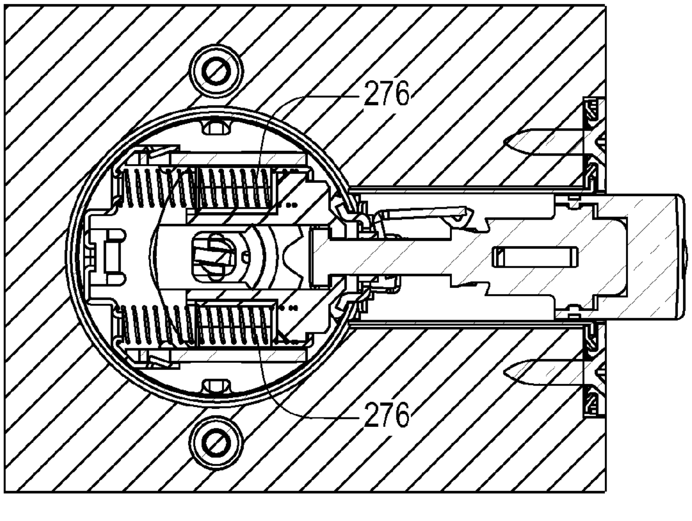
FIG. 28 is a partial cross-sectional view taken along line C-C of FIG. 26.

The tabs (or flanges) 112 of the torque plate 110 index into the corresponding torque plate index slots 24 of the lock cage subassembly 20, as best illustrated in FIG. 20. The tabs 112 have an axial extent sufficient to support the use of the same cylindrical lock assembly 10 in a range of door widths (e.g., 1¾" to 2"). Radially distal notches (or cutouts) 114 formed in the torque plate 110 are configured to interface with, and transfer torque from the torque plate 110 to, the trim posts 232 (FIG. 22). A spindle bearing aperture 116 enables the torque plate 110 to be inserted over the spindle bearing 120.

The torque plate 110 is configured to be mounted between the lock cage subassembly 20 and a door trim rose 240. In the embodiment shown in FIG. 6, the torque plate 110 is a distinct piece from the outer rose insert 230. In another embodiment (not shown), the torque plate 110 is integrally formed with an outer rose insert 230.

It will be appreciated that this torque plate mechanism provides a path for load to be transferred from the lock case subassembly 20 to the torque plate 110 to the relatively radially distal trim posts 232 to the door itself.

Turning to the spindle bearing torque-transfer structures, an arcuate handle-side rotational stop 128 formed in the cylindrical sleeve 122 of the spindle bearing 120 (FIG. 7), just beyond its external threads, prevents over-rotation of a compatibly-configured handle 12 (e.g., FIG. 22) carried on the spindle 70 or 80 borne by the bearing 120. In addition to or as an alternative to the arcuate handle-side rotational stop 128, arcuate cage-side rotational stops 130 (FIGS. 9, 11) also prevent over-rotation of the spindle 70 or 80 borne by the bearing 120. When the spindle 70 or 80 is rotated in either a clockwise or counterclockwise direction to a designed maximum limit of spindle rotation (which in one embodiment is between 40 and 65 degrees of rotation, and in a more specific embodiment approximately 50 degrees of rotation in either direction), then the radially extending portion **72*a* (FIG. 35) of the distal tab 72 of the spindle 70 or 80 butts against one or the other of the cage-side rotational stops 130, preventing further rotation of the spindle 70 or 80**.

It will be appreciated that in embodiments that combine one or more of the stop(s) 128 and/or 130 with a torque plate 110, excessive torque exerted on a spindle 70 or 80 is transferred to one or more of the stop(s) 128 and/or 130, to the lock cage subassembly 20, to the torque plate tabs 112, to the trim posts 232, to the door.

Attention is now focused on examples of key spindle assemblies 140 suitable for use with the cylindrical lock assembly 10. The cylindrical lock assembly 10 accommodates a vast number of key spindle assemblies (including both human-operated mechanical and electrically motor-actuated key spindle assemblies) configured to support different lock functions.

Figure 39:
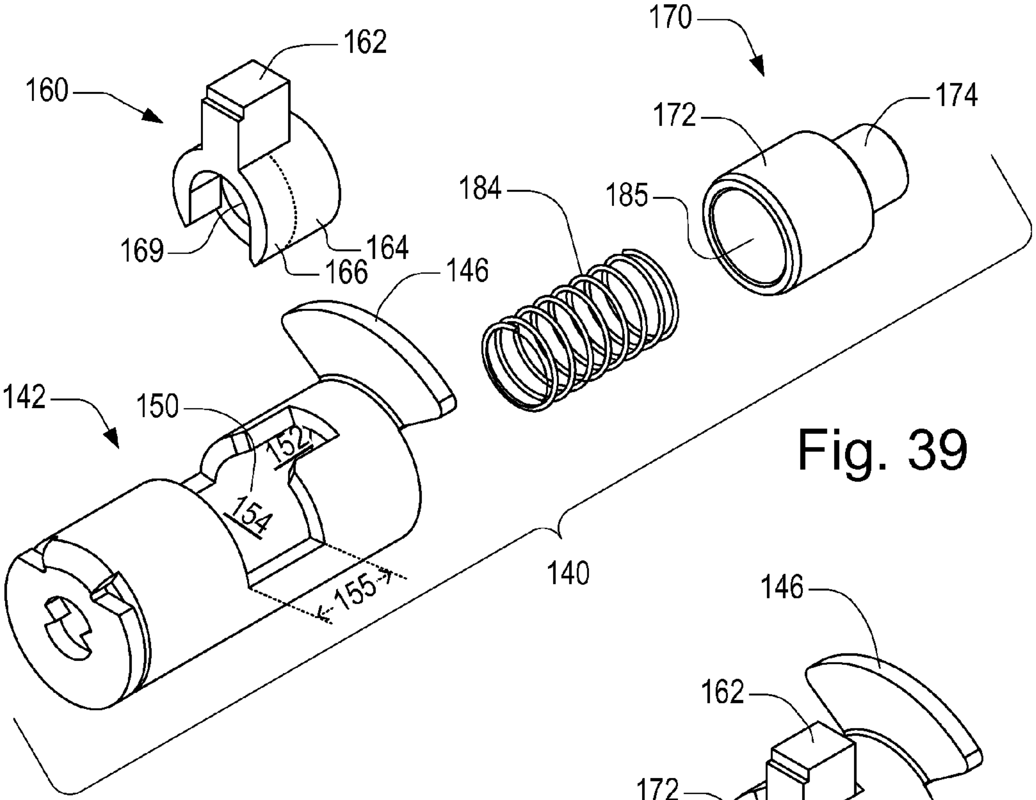
FIG. 39 is an exploded perspective view of one embodiment of a key spindle assembly.
Figure 40:
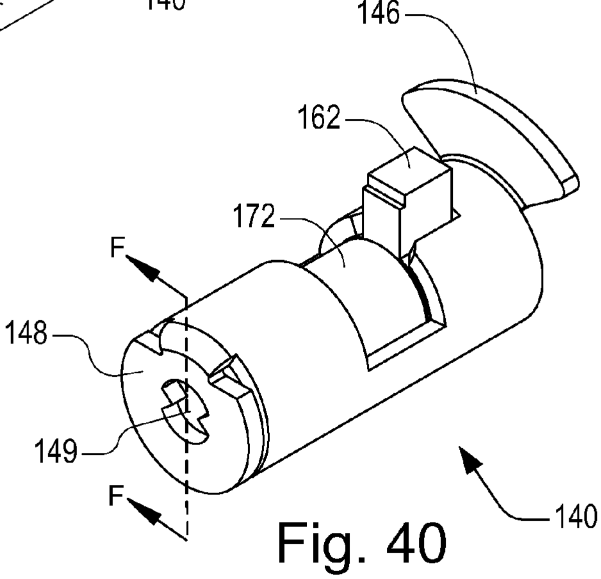
FIG. 40 is a perspective view of an assembled key spindle assembly.
Figure 42:
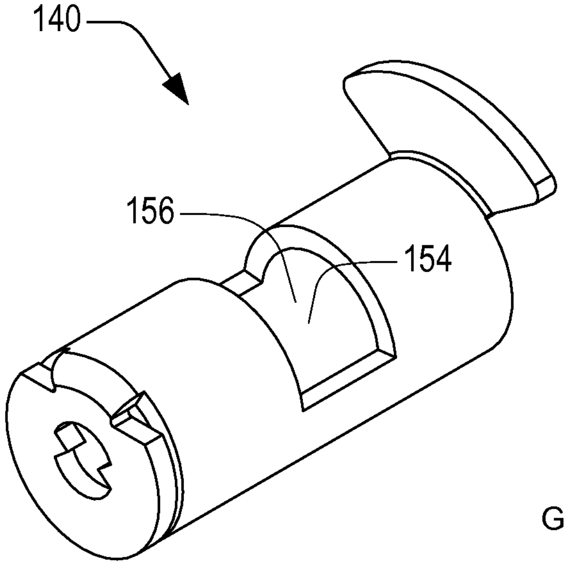
FIG. 42 is a perspective view of another embodiment of a key spindle, configured for a rigid trim lock function.
Figure 43:
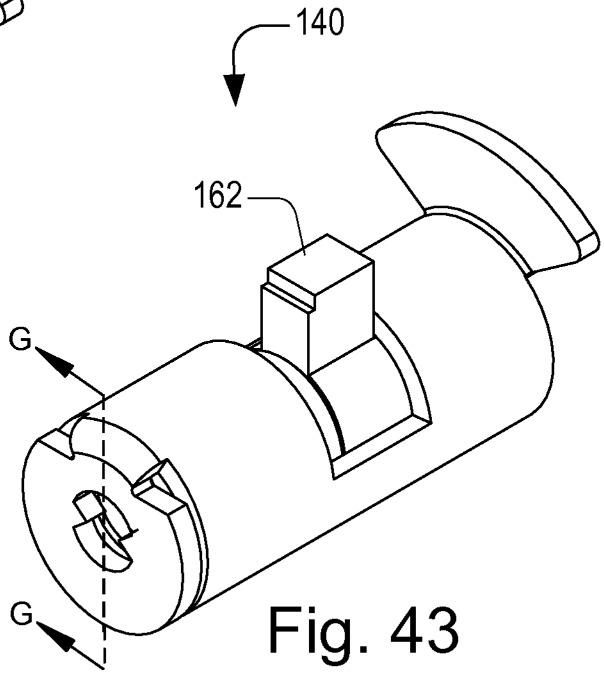
FIG. 43 is a perspective view of an assembled key spindle assembly configured for a rigid trim lock function.
Figure 44:
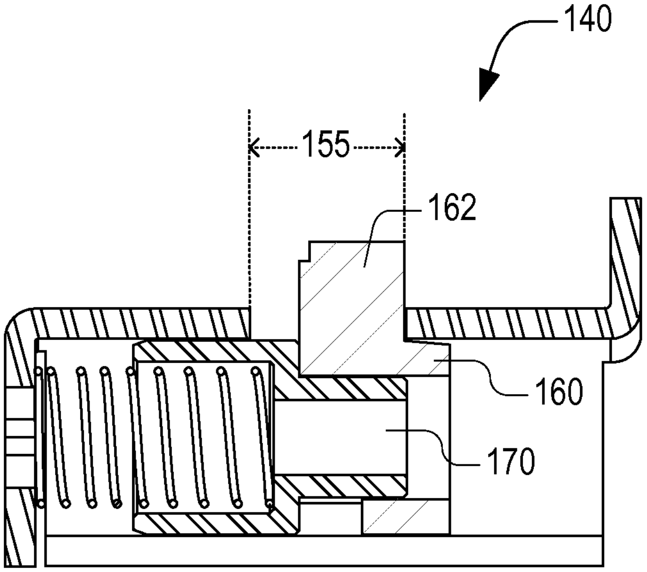
FIG. 44 is a partial cross-sectional view of the assembled key spindle assembly taken along line G-G of FIG. 43.

Illustrating just two of many contemplated human-operated mechanical embodiments, FIGS. 39 and 42 depict tubular key spindle assemblies 140 comprising a rolled up stamped sheet metal tubular key spindle 142 with folded-up retractor activation cams 146 and a folded down key plate 148. In like manner to the retractor activation cams 71 of the inner spindle 70, retractor activation cams 146 are configured to engage and operate on corresponding retractor slide cam surfaces 251 when a user turns an operatively coupled outside door handle 12.

The key spindle 142 houses a key spindle dog 160, a tubular dog guide 170, and a key spindle compression spring 184. The key spindle 142 is also provided with a dog travel window (or opening) 150 or 156 to enable rotational and/or axial movement of a dog arm 162.

Figure 3:
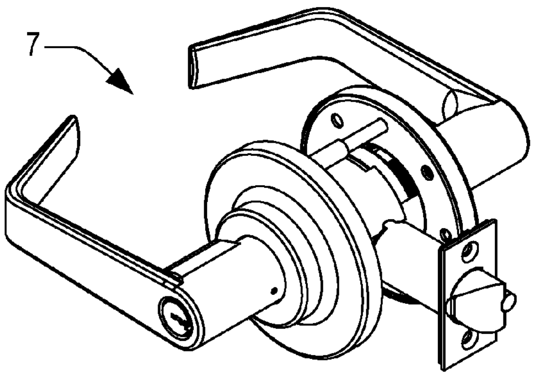
Fig. 3 PRIOR ART
FIG. 3 is a perspective view of another conventional prior-art cylindrical lockset, in which large cast spindle bearings are provided to house the lever return springs.

The dog travel window 150 or 156 is positioned opposite an axially extending seam 144 of the tubular key spindle 142, on the same side of the key spindle 142 as the retractor activation cams 146. In conventional key spindle assemblies, by contrast, a dog travel opening is positioned on the same side of the key spindle as the seam (and opposite any retractor activation cams). For example, FIG. 3 of U.S. Pat. No. 6,189,351 to Eagan illustrates a dog cam opening that is aligned with the key spindle seam, and opposite the key spindle's retractor activation cams. Accordingly, overtorquing (as in a warped door condition) can urge the seam apart. Moreover, in conventional designs, the dog travel opening (including, for example, Eagan's T-shaped slot 70) is open ended. Consequently, radially-oriented pins (e.g., Eagan's pin 60) are conventionally required to retain the locking dog in the key spindle. In the embodiments of FIGS. 39-44, by contrast, the dog travel window 150 or 156 is entirely closed (i.e., completely surrounded by a closed and continuous, non-welded, window edge of the key spindle 142). This further strengthens the key spindle 142 from overtorquing and facilitates use of a pinless key spindle dog 160.

The dog travel windows 150 and 156 of FIGS. 39 and 42 accommodate standard (rotatable) and rigid (or permanently inoperative) handle or lock functions, respectively. In the embodiment of FIG. 39, the dog travel window 150 is T-shaped, having an axial slot 152 enabling the dog 160 to translate axially, against the biasing force of compression spring 184, and a semicylindrical cross slot 154 enabling the dog 160 to rotate around the axis of the key spindle 142.

When the dog arm 162 is in the axial slot 152, the outer spindle 80 is "keyed" to the key spindle assembly 140, so that they will synchronously rotate. Stated another way, when the dog arm 162 is axially extended into the axial slot 152, the outside door handle 12 is operatively coupled to the latch 285. Torque from the outer spindle 80 is transmitted, through the interface between the key spindle dog driving slot 81 and the dog arm 162, to the key spindle dog 160. The key spindle dog 160 further transmits that torque, through the interface between its dog arm 162 and the axial slot 152, to the key spindle 142, and from there to the retractor activation cams 146.

In locking locksets, the "locked" position is defined by an axially retracted dog arm 162 butting up against the sides of the notches 134 of the outside spindle bearing 120, preventing rotation of the outer handle spindle 80. In clutching locksets, the unclutched position is defined by an axially retracted dog arm 162 free to rotate in the cross slot 154. When unclutched, torque from the key spindle dog driving slot 81 continues to be transmitted to the dog arm 162 and to the key spindle dog 160, but only to cause the dog 160 to rotate within the axial slot 152. Because the axial slot 152 has a significant, preferably approximately semicircular, angular extent, rotation of the outside spindle 80 is limited, by other means (e.g., rotational stop(s) 128 and/or 130), before the dog arm 160 ever reaches the axial edges of the cross slot 154. Accordingly, in an unclutched position, substantially no torque is transmitted from the outside spindle 80 to the key spindle 142, and therefore torque exerted on the outside spindle 80 is disabled from operating the retractor 250.

Incidentally, the radial height of the dog arm 162 determines whether it provides a clutching or locking function. A taller dog arm 162 configures the key cylinder assembly 10 for locking configuration, because in the locking position the dog arm 162 butts up against the sides of the notches 134 of the outside spindle bearing 120, preventing rotation of the outer handle spindle 80. A smaller-height dog arm 162, by contrast, configures the key cylinder assembly 10 for a clutching configuration, because the inside diameter of the spindle bearing 120 clears the top of the dog arm 162. The only modification needed to reconfigure the key cylinder assembly 10 between locking and clutching configurations is to replace the key spindle dog 160 with one having an appropriately dimensioned dog arm 162.

In the embodiment of FIG. 42, contrasting with FIG. 39's embodiment, the dog travel window 156 provides only a substantially semicylindrical and branchless (e.g., no axial slot) dog travel opening for movement of the key spindle dog arm 162. Accordingly—whether through interference between the dog arm 162 and the spindle bearing notch 134 (i.e., a rigid trim lock configuration), or through free but inoperative rotational movement between otherwise provided rotational stops (i.e., a permanently unclutched trim lock configuration)—the outside spindle 80 (but not any key cylinder 215 held within) is permanently disabled from rotating the key spindle 142. A comparison of FIGS. 39 and 42 illustrates how selection between a standard lock trim configuration and a rigid lock trim configuration can be effected merely by selecting the appropriate key spindle assembly, and more particularly between key spindle assemblies that are substantially identically configured with the exception of the configuration of the dog travel opening 150 or 156, without structural modification of other parts of the cylindrical lock assembly 10.

In both FIGS. 39 and 42, keyed operation of the key cylinder 215 will—independently of any torque exerted on the outside door spindle 80—operate the key spindle 142 to retract the latch 285. This is because the keying operation transmits torque from the tailpiece or throw member 216 of the key cylinder 215, via its interface with the butterfly-shaped throw-member receiving aperture 216 of the key plate 148, to the key spindle 142 and its retractor activation cams 146.

The key spindle dog (or dog bushing) 160 is a powdered metal part mounted for rotation about a tubular dog guide 170, the latter of which is biased away from the key plate 148 by key spindle compression spring 184. The key spindle dog 160 comprises a sleeve portion 164 that shares a cylindrical outer surface with a yoke portion 166, and a dog arm 162 protruding opposite and away from a U-shaped interior surface of the yoke portion 166. As FIG. 29 makes evident, the aperture 169 of the sleeve portion 164 interfaces with the key spindle operator 204 of the stem 202 of the button subassembly 200.

The tubular dog guide (or plug bushing) 170 is a steel part comprising a spring seating and key spindle surface bearing cylindrical portion 172 and a cylindrical stub portion 174. The key spindle dog 160 rides and is operable to pivot on the cylindrical stub portion 174 of a tubular dog guide 170. The cylindrical portion 172 defines a tubularly interior spring seat 185 for the key spindle compression spring 184, which contrasts with the tubularly exterior spring seat of Eagan's tubular plug stem 68, for example.

Figure 41:
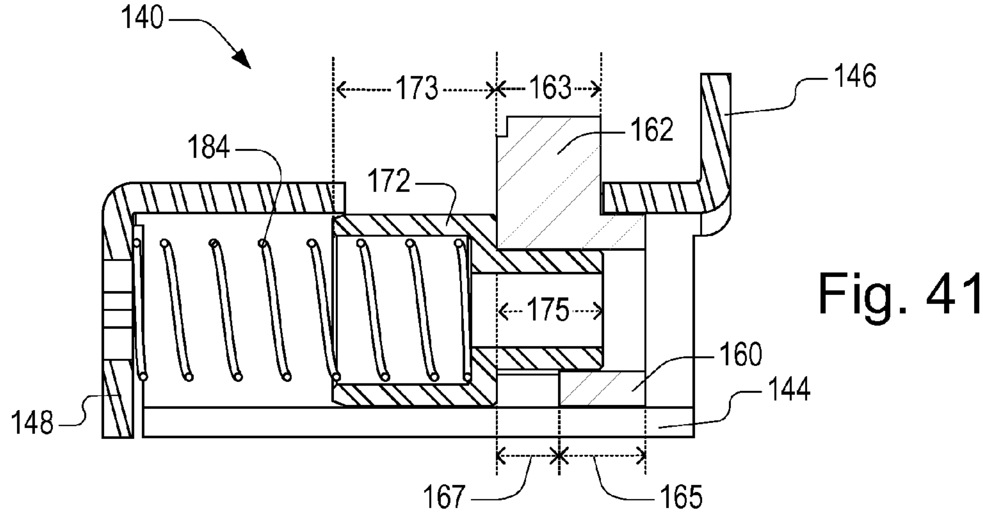
FIG. 41 is a partial cross-sectional view of the assembled key spindle assembly taken along line F-F of FIG. 40.

The axial length 155 of the cross slot 154 (FIG. 39) or dog window 156 (FIGS. 42, 44) is substantially greater than the axial length 163 of the dog arm 162, but just slightly greater than the combined axial lengths 165 and 167 of the sleeve and yoke portions 164 and 166, respectively. When the locking dog guide 170 is pushed (via a tool) substantially all of the way toward the key plate 148, the key spindle dog 160 can be inserted into (or removed from) the key spindle 142, through the cross slot 154, to ride on the cylindrical stub portion 174 of the tubular dog guide 170. Furthermore, as shown in FIG. 41, the axial length 173 of the primary cylindrical portion 172 of the tubular dog guide 170, plus the axial length 163 of the dog arm 162 (FIG. 41), is slightly greater than the axial length 155 of the semicylindrical cross slot 154 (FIG. 39), thereby preventing the tubular dog guide 170, when assembled with the key spindle dog 160, from cocking out of the cross slot 154. Also, as further shown in FIG. 41, the axial length 175 of the cylindrical stub portion 174 is in between the axial length 167 of the dog's yoke portion 166 and the combined axial lengths 165 and 167 of the dog's sleeve and yoke portions 164 and 166, so that the stub portion 174 extends part, but not all, of the way into the sleeve portion 164.

It is noted that the pivotable operation of the dog 160 facilitates escapement between the key cylinder 142, the dog 160, and the dog guide 170. With the biasing aid of the compression spring 184, key-operated rotation of the key spindle 142 relative to the outer handle-carrying spindle 80 causes the dog arm 162 to escape from the cross slot 154, if held therein, into the axial slot 152, when the axial slot 152 rotates into alignment with the key spindle dog driving slot 81 of the spindle 80.

It is noted that the structure of the cylindrical lock assembly 10 supports a much broader variety of key cylinder assemblies than the ones detailed, for exemplary and illustrative purposes, above. These include key cylinder assemblies with significantly structurally and functionally different key spindles, dogs and dog guides, as well as key cylinder assemblies with different and/or additional components. For example, assemblies providing different combinations of lock functions, assemblies involving either two inside spindles or two outside spindles, and electronic, motor-actuated configurations may suggest structurally different key cylinder assemblies.

Attention is now focused on a new and improved knob catch assembly 100, illustrated in FIGS. 30-38. It will be understood that "knob catch" is a conventional term of art, and that knob catches are suitable for retaining both conventional knobs and eccentric levers.

The knob catch assembly 100 (alternatively referred to as a knob keeper) comprises a knob catch 101, a knob catch spring 104, and a backup washer 107. The knob catch 101 (alternatively referred to as a catch body or driver) includes a projecting lug (or catch tongue) 102 that projects through a knob catch lug cross slot 76 of the handle-carrying spindle 70 or 80. The knob catch 101 also includes a spring leg aperture, in which the legs 106 of the knob catch spring 104 are seated, to urge the projecting lug 102 of the knob catch 101 into a handle-retaining position.

Figure 37:
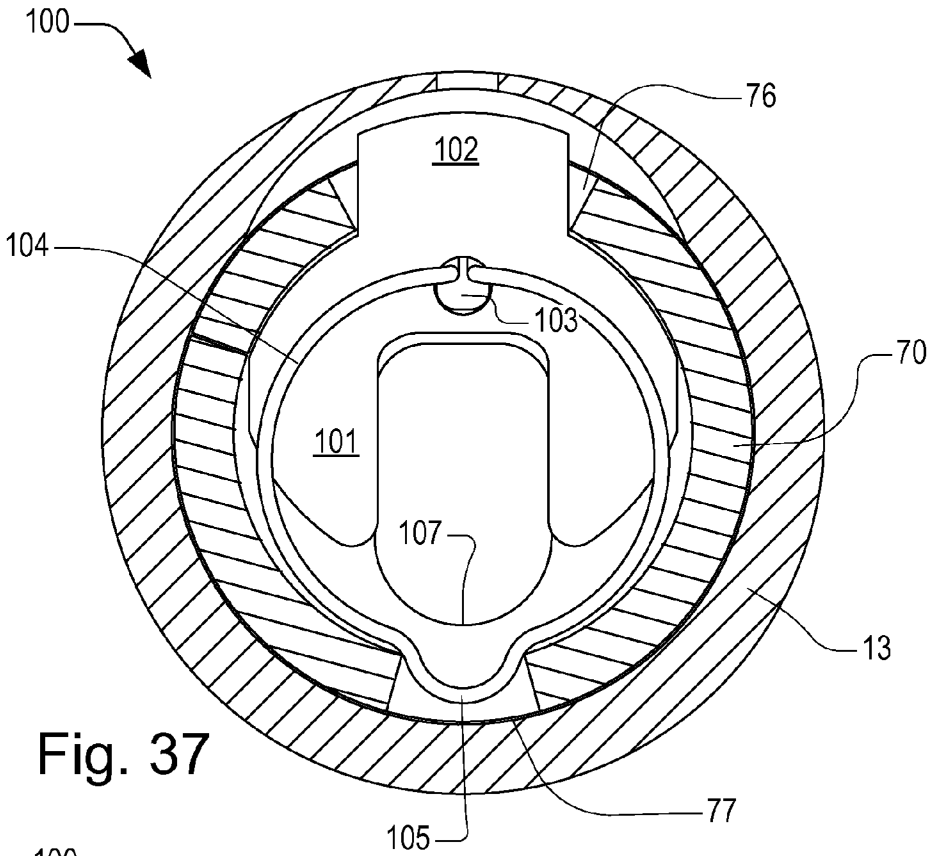
FIG. 37 is a partial cross-sectional view of an inside spindle and knob catch assembly showing the knob catch in a lever-restraining position.
Figure 38:
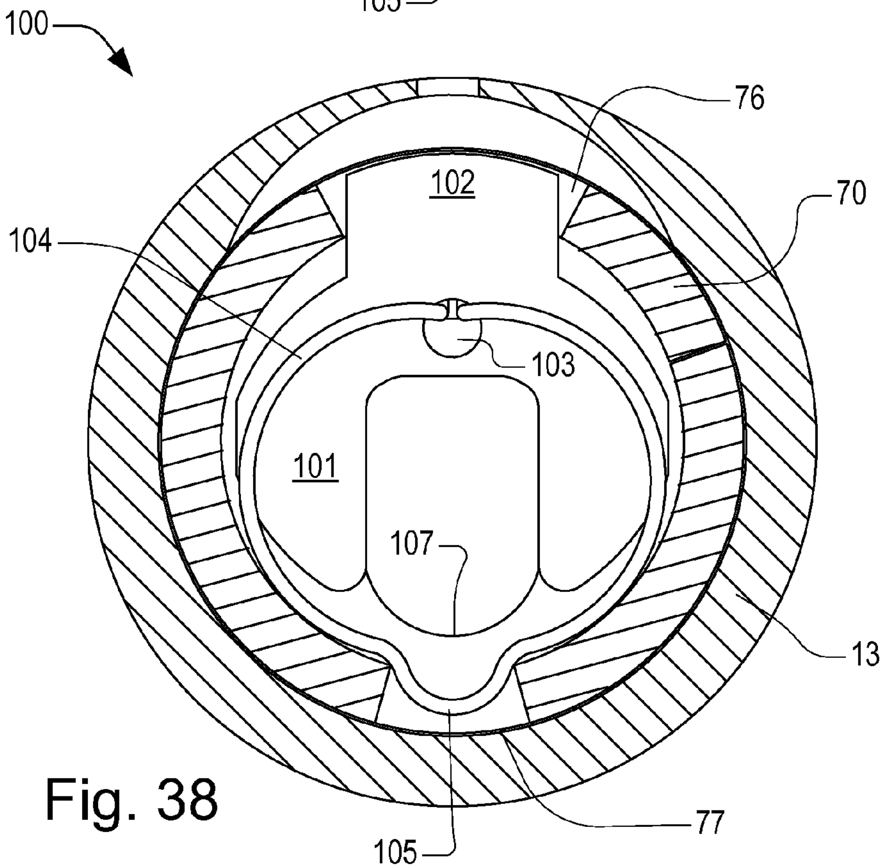
FIG. 38 is a partial cross-sectional view of the inside spindle and knob catch assembly showing the knob catch in a retracted position and the knob catch spring in an elastically deformed position.

The wrap around knob catch spring 104 is an arcuate-shaped wire formed into a substantially continuously curved segment extending approximately a full 360 degrees around a nearly circular arc (FIG. 37). In an alternative embodiment, the curved segment extends around a shorter arc, but one that is still greater than 180 degrees. When release-actuating force is imposed on the knob catch assembly 100, it causes elastic deformation (and bulging) of a substantial portion of the arcuate segment of the wrap-around catch spring 104 (as illustrated in FIG. 38). By contrast, the polygonally-shaped spring 150 illustrated in U.S. Pat. No. 4,394,821 to Best, release-actuating load is borne disproportionately in the bends between the transverse and side legs 250 and 252. Here, by contrast, release-actuating load is distributed more evenly, and along most of the arcuate portion, of the spring 104.

The radiused spring bump (or nub) 105 formed in the wrap around spring 104, opposite the catch spring legs 106, seats the spring 104 in the knob catch spring seat 77 of the handle-carrying spindle 70 or 80. The legs 106 of the knob catch spring 104 are held in the spring feet aperture 103 (or in an alternative embodiment, in a notch or in two separate apertures or notches), of the knob catch 101.

The knob catch backup washer 107 is inserted in bent form, and then straightened and pressed into face-to-face contact with the knob catch 101. When pressed into place, a first tab 108, next to knob catch lug 102, seats into a T-stem of the knob catch lug cross slot 76 (FIG. 18), and a second tab 109, next to the knob catch spring bump 105, seats into the knob catch spring seat 77, adjacent the knob catch spring 104.

Figure 5:
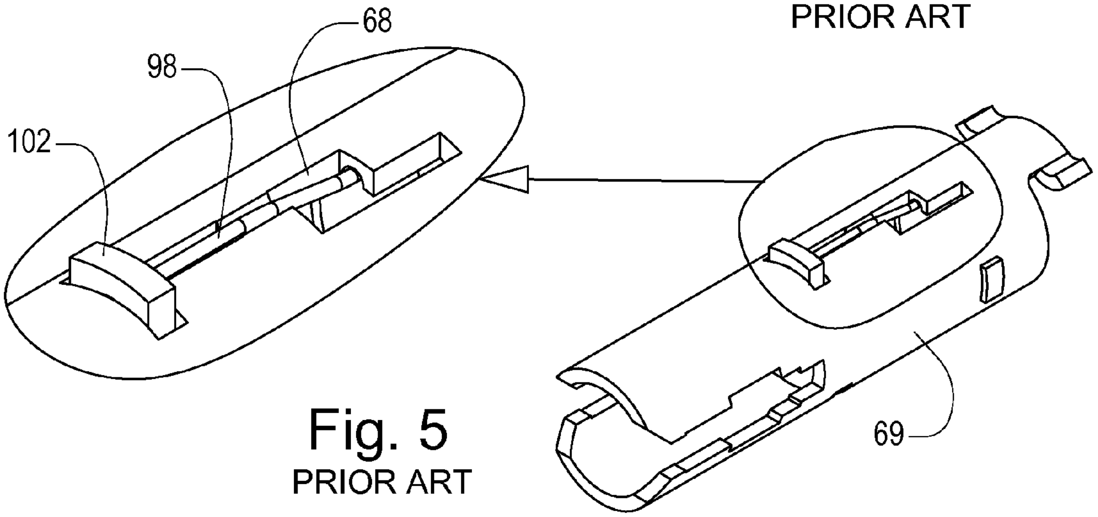
Fig. 5 PRIOR ART
FIG. 5 illustrates a conventional cantilever-type knob catch assembly housed in a spindle, the knob catch assembly including an elongated cantilevered spring held within an elongated axial slot of the spindle.

It will be appreciated that the knob catch assembly 100 improves significantly over cantilevered spring wire knob catch designs (such as illustrated in FIG. 5), which are either comparatively weak or easily and quickly overstressed. The knob catch assembly 100 also improves over the knob catch configuration of U.S. Pat. No. 4,394,821 to Best. As shown in FIGS. 8 and 9 of the latter patent, Best's polygonally-shaped spring 150 cams on the inside of the spindle. Moreover, Best's design calls for a much longer transverse slot 146, resulting in a weaker spindle, than the knob catch spring seat 77 provided in the spindles 70 and 80 shown herein. As is evident from the drawings, seat 77 has a much smaller profile than the cross slot provided for the knob catch assembly illustrated in Best.

Turning attention to a few remaining details, external threads 124 are provided on each spindle bearing 120 for receiving correspondingly internally threaded rose collars 245 (FIG. 22). Also, as illustrated best in FIG. 22, handle (e.g., lever or knob) 12 comprises a sleeve 13 with a stepped, axially extending portion 14 that butts against the handle-side rotational stop 128 of the spindle bearing 120 at configured limits of handle rotation.

Figure 4:
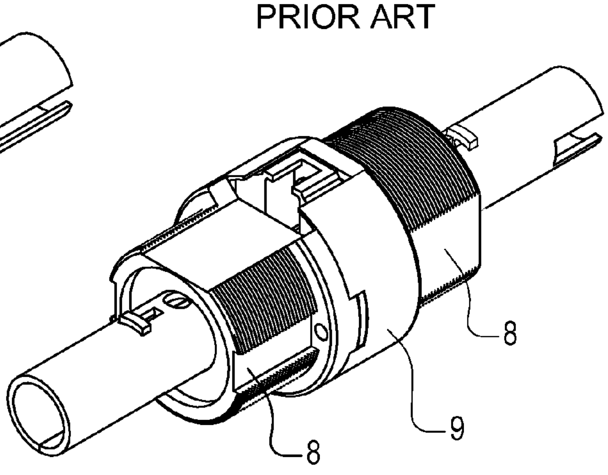
Fig. 4 PRIOR ART
FIG. 4 is a perspective view of the lockset of FIG. 3 with trim removed, revealing a lock cage and cover that contains only the retractor and large cast spindle bearings housing the lever return springs.

Notably, the spindle bearing 120 (FIG. 7) has a relatively small profile, unlike conventional enlarged spindle bearings (of which FIG. 4 is one illustration) that are designed to encase a spindle return spring. Likewise, the rose inserts 220 and 230 and roses 240 (FIG. 22), like the spindle bearing 120, have a relatively small profile, compared to conventional enlarged roses and/or rose inserts (of which FIG. 1 is an illustration) that are designed to encase a spindle return spring.

Among the many advantages various aspects that the innovations disclosed herein provide over the prior art, it will be appreciated that one of them is the enablement of the production of high strength cylindrical locksets at significantly lower production costs than prior art designs having comparable (and in some aspects inferior) strength and functionality. For example, fewer and/or smaller costly components are needed. The lock cage subassembly 20, torque plate 110, cover 50, keepers 60, spindles 70 and 80, key spindle 142, and rose inserts 220 and 230 (not including trim posts 232) can all, for example, be produced from stamped sheet metal. Other components (e.g., machined components)—such as the spindle bearings 120—are significantly smaller and lighter weight than functionally comparable cast part alternatives. No cast parts and no large and expensive spindle-return-spring cages are needed.

Furthermore, the innovations disclosed herein enable production of high strength cylindrical locksets that are potentially lighter, and with a rose trim set that is smaller and more discretely profiled, than prior art designs having comparable strength and functionality.

Yet another advantage is the support of a broad spectrum of lock functions while minimizing configuration differences and the number of differently configured components.

Yet further advantages include stronger handle-carrying spindles 70 and 80, a stronger key spindle 140, a cage assembly indexing torque plate 110, new and improved rotational stops 128 and 130, and knob catch assembly 100 improvements.

All of the aforementioned prior art references are herein incorporated by reference for all purposes.

It should be noted that the embodiments illustrated in FIGS. 6-44 and described in detail herein are exemplary only, and that various other alternatives, adaptations, and modifications may be made within the scope of the present invention. Accordingly, the present invention is not limited to the specific embodiments illustrated herein, but is limited only by the following claims.

We claim:

1. A door lock assembly comprising:

a lock body;

a spindle, for carrying a handle, extending through an opening of the lock body;

a knob catch assembly seated in the spindle;

the knob catch assembly comprising a wrap-around catch spring house inside the spindle and seated in an opening of the spindle; and the wrap-around catch spring having a substantially continuously curved segment that extends around an arc that is greater than 180 degrees;

wherein release-actuating force imposed on the knob catch assembly compresses the substantially continuously curved segment of the wrap-around catch spring.

2. The door lock assembly of claim 1, wherein the knob catch assembly further comprises a knob catch.

3. The door lock assembly of claim 2, wherein the knob catch includes a projecting lug that projects through a knob catch lug slot of the spindle.

4. The door lock assembly of claim 2, wherein legs of the wrap-around spring catch are seated in one or more holes of the knob catch.

5. The door lock assembly of claim 2, wherein a spring bump formed in the wrap-around catch spring, opposite the catch spring legs, is seated in a knob catch spring seat of the spindle.

6. The door lock assembly of claim 2, wherein the projecting lug, when pressed down, compresses the catch spring, causing radial arcs of the catch spring within the spindle to bulge elliptically.

7. The door lock assembly of claim 1, wherein the knob catch assembly further comprises a knob catch backup washer to resist an axial load produced by pulling a handle away from the lock body.

8. The door lock assembly of claim 7, wherein the knob catch backup washer includes top and bottom tabs for seating the knob catch backup washer in opposite slots in the spindle, in face-to-face contact with the knob catch.

9. The door lock assembly of claim 7, wherein the knob catch is seated between the knob catch backup washer and the wrap-around catch spring, thereby restraining the knob catch to radial movement.

10. A door lock assembly comprising:

a lock body;

a spindle, for carrying a handle, extending through an opening of the lock body;

a knob catch assembly seated in the spindle;

the knob catch assembly comprising a knob catch mounted for extended or retracted movement in a knob catch opening, a spring urging the knob catch to an extended position, and a knob catch backup washer to resist axial loads produced by efforts to pull the handle off of the spindle.

wherein the spring is housed inside the spindle.

11. The door lock assembly of claim 10, wherein the knob catch backup washer includes top and bottom tabs for seating the knob catch backup washer in opposite slots in the spindle, in face-to-face contact with the knob catch.

12. The door lock assembly of claim 10, wherein the knob catch is seated between the knob catch backup washer and the spring, thereby restraining the knob catch to radial movement.

13. A door lock assembly comprising:

a lock body;

a spindle, for carrying a handle, extending through an opening of the lock body;

a refractor housed within the lock body; and a key spindle assembly mounted in the handle-carrying spindle;

wherein the key spindle assembly comprises:

one or more refractor activation cams operable, upon rotation of the key spindle assembly, to cam the refractor into a latch-retracting position; and a key spindle housing a key spindle dog for rotation within the key spindle; and wherein the key spindle dog has a dog arm protruding through a dog travel window of the key spindle;

the dog travel window is defined by a closed, continuous edge of the key spindle; and the dog arm further protrudes into a key spindle dog driving slot of the spindle, rotationally interlocking the handle-carrying spindle to the dog arm.

14. The door lock assembly of claim 13, wherein:

the key spindle comprises a sheet metal piece rolled up into a generally tubular form, with edges of the sheet metal piece defining an axially extending seam; and the dog travel window is positioned on a side of the key spindle opposite the axially extending seam.

15. The door lock assembly of claim 13, wherein the key spindle dog is held within the key cylinder without the aid of a pin.

16. The door lock assembly of claim 13, wherein the dog travel window is defined at least by an approximately semi-cylindrical cross slot, the cross slot enabling the key spindle dog to be inserted through the dog travel window.

17. A door lock assembly comprising: a lock body;

a spindle, for carrying a handle, extending through an opening of the lock body;

a refractor housed within the lock body; and a key spindle assembly mounted in the handle-carrying spindle; wherein the key spindle assembly comprises:

a key spindle formed from a sheet metal piece rolled up into a generally tubular form, with edges of the sheet metal piece defining an axially extending seam; and one or more refractor activation cams operable, upon rotation of the key spindle assembly, to cam the retractor into a latch-retracting position; and wherein the key spindle houses a key spindle dog for rotation within the key spindle;

the key spindle dog has a dog arm protruding through a dog travel opening of the key spindle;

the dog travel opening is positioned on a side of the key spindle opposite the axially extending seam; and the dog arm further protrudes into a key spindle dog driving slot of the handle-carrying spindle, rotationally interlocking the handle-carrying spindle to the dog arm.

18. The door lock assembly of claim 17, wherein the dog travel opening is a window defined by a closed, continuous edge of the key spindle.

* * * * *